(12) United States Patent
Tanji et al.

(10) Patent No.: US 8,562,898 B2
(45) Date of Patent: Oct. 22, 2013

(54) METHOD FOR FORMING RESIN MOLDED ARTICLES

(75) Inventors: Tadatoshi Tanji, Kanagawa (JP); Shingo Nagashima, Kanagawa (JP)

(73) Assignee: Kyoraku Co., Ltd., Kyoto (JP)

( * ) Notice: Subject to any disclaimer, the term of this patent is extended or adjusted under 35 U.S.C. 154(b) by 232 days.

(21) Appl. No.: 12/868,919

(22) Filed: Aug. 26, 2010

(65) Prior Publication Data

US 2011/0101561 A1    May 5, 2011

(30) Foreign Application Priority Data

Sep. 1, 2009    (JP) ................................ 2009-201985

(51) Int. Cl.
*B29C 51/02*    (2006.01)
(52) U.S. Cl.
USPC ....... 264/515; 264/545; 264/250; 264/177.17
(58) Field of Classification Search
USPC ......... 264/263, 515, 545, 250, 210.1, 177.14, 264/177.17, 177.19; 425/367, 233, 235, 425/388, 408
See application file for complete search history.

(56) References Cited

U.S. PATENT DOCUMENTS 2,348,345 A * 5/1944 Hornbostel ................ 100/162 R
7,153,458 B2 * 12/2006 Ide et al. ....................... 264/148

FOREIGN PATENT DOCUMENTS

| JP | 04-002087 B2 | 11/1986 |
| JP | 03-027922 A | 2/1991 |
| JP | 11-005248 A | 1/1999 |
| JP | 2000218682 A * | 8/2000 |

OTHER PUBLICATIONS

Endo, Haruhiro, "Blow molding of resin hollow molded article" JP 2000-218682 A machine translation, Aug. 2000.*

* cited by examiner

*Primary Examiner* — Galen Hauth
(74) *Attorney, Agent, or Firm* — Lowe Hauptman & Ham, LLP

(57) ABSTRACT

A method for forming a resin molded article includes a step of extruding a thermoplastic resin intermittently at a predetermined speed from an extrusion slit, such that the resin droops downward in a shape of a sheet. The method further includes the steps of: feeding the extruded sheet-shaped resin downward by a pair of rollers; and forming the sheet-shaped resin with a mold. In the step of feeding the sheet-shaped resin, one of the rollers is pressed against the other, but not to the extent of crushing the sheet-shaped resin, regardless of the thickness of the sheet-shaped resin. In addition, a surface temperature of each of the rollers is set lower than a temperature of the sheet-shaped resin and within a predetermined temperature range. This method can prevent sliding contact between the rollers and the sheet, while preventing the sheet from being wound around the rollers.

8 Claims, 20 Drawing Sheets

WIDTH DIRECTION

METHOD FOR FORMING RESIN MOLDED ARTICLES

CROSS REFERENCE

This application is based on Japanese Patent Application No. 2009-201985 filed with the Japan Patent Office on Sep. 1, 2009, the entire content of which is hereby incorporated by reference.

FIELD OF THE INVENTION

The present invention relates to a method for forming a resin molded article. More specifically, the present invention relates to a method for forming a resin molded article using a thermoplastic resin which is extruded to droop downward in primary forming, and then formed in secondary forming.

BACKGROUND OF THE INVENTION

To manufacture a sandwich panel, for example, a conventionally used forming method employs primary forming using extrusion, in combination with secondary forming using blow (or vacuum). According to such a forming method, an extruded molten resin is directly subjected to blow molding (or vacuum forming). This method thus makes it possible to form a sandwich panel without posing a technical problem such as non-uniform heating, which would otherwise be caused by reheating of an already formed resin. Particularly in this forming method, blow molding (or vacuum forming) is performed by causing an extruded molten resin to droop downward as it is, and then clamping the vertically extending resin. Therefore, it is not necessary to support the molten resin until clamping performed in the secondary forming, unlike in the case of for example, extruding a resin laterally. It is thus possible to feed a resin in a non-contact state from an extrusion die. Such a forming technique is disclosed in, for example, Patent Documents 1 to 3.

In each of the forming techniques disclosed in Patent Documents 1 to 3, a molten resin is allowed to pass through between a pair of rollers, before the molten resin extruded downward is formed within a mold. However, the pair of rollers disclosed in Patent Document 1 is merely pressure rollers for pressure-bonding a sheet-shaped resin extruded from an extrusion head to a decorative sheet. In the techniques disclosed in Patent Documents 2 and 3, on the other hand, a gap between the pair of rollers is set smaller than a thickness of a sheet-shaped molten resin. In addition, a temperature of the rollers is set close to that of the sheet-shaped molten resin. Under such conditions, the sheet-shaped resin is allowed to pass through between the pair of rollers to thereby be formed. It is thus possible to provide a mirrored or glossy surface of the sheet. In these conventional forming techniques, however, the molten resin extruded prior to secondary forming is caused to droop downward as it is. As a result, the following technical problems arise.

The first problem is that draw-down or neck-in, which occurs in a molten sheet, makes a thickness of the sheet prior to forming in a mold uneven in an extruding direction or a width direction of the sheet. When the sheet is finally formed by secondary forming using blow or suction (vacuum), the uneven thickness in the extruding direction of the sheet before the secondary forming affects a thickness of the finished sheet after the secondary forming. To cope with this problem, for example, when, during forming of the sheet, an extrusion speed of the sheet is changed to increase according to the draw-down as the forming proceeds, a thickness of the sheet corresponding to a later stage of the forming can be increased toward an upper part of the sheet. Therefore, it seems possible to cope with the thinning of the upper part of the sheet caused by the draw-down. However, the change in the extrusion speed of the sheet causes a change in an extrusion pressure of the sheet. As a result, a swelling in the molten resin extruded from an extrusion slit changes, which rather accelerates the unevenness of the sheet thickness. Note that Patent Document 3 discloses controlling a pulling speed of a sheet or adjusting a rotation speed of a screw of an extruder according to the draw-down of each sheet. However, this does not suppress or eliminate occurrence of the draw-down of each sheet. In this case, assuming that the draw-down occurs in two sheets, the pulling speed of the sheets is controlled or the rotation speed of the screw of the extruder is adjusted, and consequently, both the sheets are merely supplied into a mold almost at the same time.

It is possible to prevent such draw-down or neck-in to some extent by employing, as the resin used for a sheet, the one having a predetermined or smaller MFR value or melt tension value. In this case, however, materials that can be used are limited, which is not practical. Particularly when forming a thin sheet, the larger the MFR value, the better. For these reasons, limiting the MFR value may not solve the problem.

The second problem is that, when a pair of rollers is used to feed a sheet-shaped molten resin downward in order to eliminate the first technical problem, i.e., the unevenness of the sheet thickness before forming, the sheet-shaped resin may rather get caught in the rollers. More specifically, in order to reliably feed the sheet-shaped molten resin by the pair of rollers, it is important to ensure a dynamic frictional force between a surface of each roller and a surface of the sheet. On the other hand, when the pair of rollers sandwiches the sheet-shaped molten resin and feeds it downward, the pair of rollers is heated by the sheet-shaped resin due to thermal conduction. Therefore, in a stationary state, a temperature of outer surfaces of the pair of rollers is close to a temperature of the sheet-shaped resin. In this case, also in the stationary state, the larger the pressing force of the pair of rollers against the sheet-shaped resin, the easier for the sheet-shaped molten resin to closely adhere to the outer surfaces of the pair of rollers. Therefore, the sheet-shaped resin may be wound around the outer surfaces of the rollers along with the rotation thereof, instead of being fed downward. However, when decreasing the dynamic frictional force by reducing the pressing force, there may be sliding contact between the outer surfaces of the pair of rollers and the surfaces of the sheet-shaped resin, which makes it difficult to reliably feed the sheet-shaped resin downward.

In contrast, in a hollow molding method disclosed in Patent Document 4, an extrusion head extrudes a pair of sheet-shaped resins each having a half-arched cross-sectional shape. Each of the two sheet-shaped resins is supported by roller-shaped guiding members so as to widen a gap between the opposed resins, made into a flat shape, and then allowed to droop in the vicinity of one of mating surfaces of split mold blocks. After that, the split mold blocks are clamped while a pressurized fluid is introduced into the sheet-shaped resin, thereby fondling a hollow object. More specifically, the two sheet-shaped resins, which are extruded by the extrusion head to droop downward, are guided by the guiding members in such a manner as to widen the gap between the resins. A guiding resistance at this time prevents the draw-down of a parison in a portion between the extrusion head and the guiding member. In addition, the parison is formed into a uniform flat shape through the guiding members. Patent Document 4 also describes that the guiding members, which correspond to the pair of rollers, may be driven to rotate synchronously. Patent Document 4 further describes that a temperature controller may be provided inside the guiding member to control a surface temperature of the guiding member to be close to a temperature of the sheet-shaped resin.

However, the prevention of draw-down of a parison disclosed in Patent Document 4 is realized by arranging the pair of roller-shaped guiding members in a direction of widening a gap therebetween. It is merely an optional configuration to drive the guiding members to rotate synchronously and provide the temperature controller inside the guiding member so as to control a surface temperature of the guiding member to be close to a temperature of the sheet-shaped resin. In other words, Patent Document 4 discloses neither a specific configuration to drive the guiding members to rotate synchronously, nor a temperature controller configured to control a surface temperature of the guiding member to be lower than a temperature of the sheet-shaped resin. Furthermore, Patent Document 4 does not even suggest, not to mention disclosing, the technical problems such as sliding contact between the guiding member and the sheet-shaped resin and winding of the sheet-shaped resin around the guiding member, which are caused by the fact that the sheet-shaped resin is fed through the guiding members.

The third problem is that, the more the rotation speed of the rollers increases to improve forming efficiency, the more noticeably the sheet is wound around the outer surfaces of the rollers. However, when the rotation speed of the rollers is decreased to prevent the sheet from being wound around the outer surfaces of the rollers, the forming efficiency is lowered.

The documents that describe the related art are listed below.
Patent Document 1: JP 2000-218682 A
Patent Document 2: JP 3-27922 A
Patent Document 3: JP 11-5248 A
Patent Document 4: JP 04-2087 B

SUMMARY OF THE INVENTION

In view of the technical problems described above, an object of the present invention is to provide a method for forming a resin molded article, a resin molded article forming apparatus, and an apparatus for adjusting a thickness of a thermoplastic resin sheet. The method and the apparatuses are capable of preventing sliding contact between outer surfaces of a pair of rollers and surfaces of a thermoplastic resin sheet while ensuring forming efficiency, and capable of preventing the sheet from being wound around the outer surfaces of the rollers while keeping the sheet in a state suitable for secondary forming, when adjusting a thickness of the thermoplastic resin sheet by the pair of rollers.

In order to achieve the above object, a method for forming a resin molded article according to an embodiment of the present invention includes the steps of: melting and kneading a thermoplastic resin; storing a predetermined amount of the melted and kneaded thermoplastic resin; extruding the stored thermoplastic resin intermittently in a predetermined extrusion amount per unit time from an extrusion slit provided in a T-die and having a predetermined gap, such that the resin droops downward in a shape of a molten sheet; sandwiching the sheet-shaped resin between a pair of rollers and feeding the resin downward by rotary driving of the rollers, in such a manner that the pair of rollers is relatively moved toward each other after a lowermost part of the sheet-shaped molten resin extruded downward passes through between the pair of rollers whose gap is widened to be larger than the predetermined thickness of the sheet-shaped resin; disposing the sheet-shaped molten resin, fed by the rollers, near a side of a mold arranged below the pair of rollers; forming the sheet-shaped resin in a shape conforming to a shape of the mold by depressurizing a sealed space formed between the sheet-shaped resin and the mold and/or pressurizing the sheet-shaped resin toward the mold; and in the step of feeding the sheet-shaped resin, setting a surface temperature of each of the pair of rollers lower than a temperature of the extruded sheet-shaped molten resin and within a predetermined temperature range.

According to the method for forming a resin molded article having the above configuration, a thermoplastic resin is extruded intermittently as a sheet-shaped molten resin by primary forming (extrusion molding). Continuously after the primary forming, the extruded sheet-shaped resin can be formed with a mold by secondary forming (blow molding or vacuum forming). More specifically, first, a predetermined amount of a melted and kneaded thermoplastic resin is stored. The stored thermoplastic resin is then intermittently extruded from an extrusion slit, which is provided in a T-die and has a predetermined gap, in a predetermined extrusion amount per unit time. Consequently, the thermoplastic resin is swollen to become a molten sheet and droops downward. At this time, the thermoplastic resin is extruded at a predetermined extrusion speed with a predetermined thickness. Then, a gap between a pair of rollers arranged below the extrusion slit is widened to be larger than the thickness of the sheet-shaped resin. As a result, a lowermost part of the sheet-shaped molten resin extruded downward is smoothly supplied between the pair of rollers. Next, the pair of rollers is caused to approach each other to narrow the gap therebetween, thereby sandwiching the sheet-shaped resin, which is then fed downward by the rotation of the rollers. At this time, one of the rollers is pressed against the other, but not to the extent of crushing the sheet-shaped resin sandwiched between the pair of rollers, regardless of the thickness of the swollen sheet-shaped resin supplied between the pair of rollers. In this manner, the gap between the pair of rollers conforms to the thickness of the supplied sheet-shaped resin. In addition, while the sheet-shaped resin is supplied between the pair of rollers, a rotation speed of the rollers is adjusted such that a downward feeding speed of the sheet-shaped resin by the pair of rollers is the extrusion speed or more of the sheet-shaped resin. Furthermore, a surface temperature of each of the pair of rollers is set lower than a temperature of the supplied sheet-shaped resin and within a predetermined temperature range. A dominant factor for feeding the sheet-shaped resin downward by the pair of rollers is a dynamic frictional force acting between outer surfaces of the pair of rollers and outer surfaces of the sheet-shaped resin. The dynamic frictional force is determined by a dynamic frictional coefficient determined by materials of each of the sheet-shaped resin and the rollers, and a pressing force of the rollers against the sheet-shaped resin. In this connection, the dynamic frictional coefficient can be increased by forming irregular textures on the surface of each of the pair of rollers while limiting the pressing force of the pair of rollers against the sheet-shaped resin. This makes it possible to reliably feed the sheet-shaped resin downward, without causing sliding contact between the outer surface of each of the pair of rollers and the corresponding surface of the sheet-shaped resin. Furthermore, the sheet-shaped resin is prevented from being wound around the pair of rollers without decreasing the rotation speed of the rollers, by setting the surface temperature of each of the pair of rollers lower than the temperature of the sheet-shaped resin by a predetermined temperature or more. On the other hand, by preventing the surface temperature of the rollers from being lower than the temperature of the sheet-shaped resin by a predetermined temperature or more, the sheet-shaped resin can be maintained in a molten state suitable for the secondary forming.

In this state, as the swollen sheet-shaped resin is fed downward by the pair of rollers, a length of the sheet-shaped resin drooping in the vertical direction increases. Accordingly, the drooping sheet-shaped resin becomes thinner toward an upper part thereof due to its own weight (draw-down or neck-in). Furthermore, the rotation speed of the rollers is adjusted such that the feeding speed by the pair of rollers becomes the extrusion speed or more. Thereby, the sheet-shaped resin is pulled downward by the pair of rollers, and is stretched and thinned. In this case, the rotation speed of the rollers is decreased with time, so that the feeding speed is adjusted to be close to the extrusion speed of the thermoplastic resin sheet. Consequently, a downward pulling force by the pair of rollers is reduced toward the upper part of the sheet-shaped resin, which relatively reduces the stretching and thinning caused by such a pulling force. Therefore, the thinning caused by the draw-down or neck-in can be canceled, and thus the draw-down or neck-in can be effectively prevented. This makes it possible to provide an even thickness in the extruding direction. Next, the sheet-shaped resin having an even thickness in the extruding direction is disposed between split mold blocks arranged below the pair of rollers. Then, the split mold blocks are clamped upon complete extrusion of a predetermined amount of the sheet-shaped resin. Then, air between the sheet-shaped resin and the split mold block is pressurized and/or depressurized to thereby form the sheet-shaped resin in a shape conforming to a shape of the mold. This makes it possible to form a resin molded article having a desired thickness in the extruding direction, without adversely affecting the forming in the secondary forming.

In addition, the step of setting the surface temperature of the pair of rollers preferably includes a step of lowering the surface temperature of the pair of rollers by cooling an inside of each of the pair of rollers with water. Moreover, a temperature of the cooling medium is preferably set according to a type of the sheet-shaped resin. Furthermore, when the sheet-shaped resin is an amorphous resin, the predetermined temperature range is preferably from about 80° C. to about 95° C. Furthermore, when the sheet-shaped resin is a crystalline resin, the predetermined temperature range is preferably from about 50° C. to about 90° C. In addition, the temperature of the cooling medium is preferably kept constant during the forming of the sheet-shaped resin.

In order to achieve the above object, a method for forming a resin molded article according to an embodiment of the present invention includes the steps of: melting and kneading a first thermoplastic resin; storing a predetermined amount of the melted and kneaded first thermoplastic resin; extruding the stored first thermoplastic resin intermittently from a first T-die to droop downward in a shape of a molten sheet; sandwiching the first sheet-shaped resin, extruded downward, between a first pair of rollers arranged below the first T-die and feeding the first sheet-shaped resin downward by rotary driving of the rollers; setting a surface temperature of each of the first pair of rollers lower than an outer surface temperature of the first sheet-shaped molten resin extruded toward the first pair of rollers and within a predetermined temperature range;

melting and kneading a second thermoplastic resin; storing a predetermined amount of the melted and kneaded second thermoplastic resin; extruding the stored second thermoplastic resin intermittently from a second T-die to droop downward in a shape of a molten sheet; sandwiching the second thermal sheet-shaped resin, extruded downward, between a second pair of rollers arranged below the second T-die and feeding the second sheet-shaped resin downward by rotary driving of the rollers; setting a surface temperature of each of the second pair of rollers lower than an outer surface temperature of the second sheet-shaped molten resin extruded toward the second pair of rollers and within a predetermined temperature range; and disposing the first and second sheet-shaped molten resins, fed by the rollers, between split mold blocks arranged below the first and second pairs of rollers, and depressurizing air between one of the split mold blocks and the first sheet-shaped resin to cause the first sheet-shaped resin to closely adhere to one of mold cavities, while depressurizing air between the other split mold block and the second sheet-shaped resin to cause the second sheet-shaped resin to closely adhere to the other mold cavity, after which the split mold blocks are clamped, wherein, upon the clamping of the split mold blocks, the first and second sheet-shaped resins are integrally welded to each other by pinch-off forming portions on outer peripheries of the mold blocks to form a resin molded article having a sealed hollow portion.

BRIEF DESCRIPTION OF THE DRAWINGS

The foregoing and other objects, features, aspects and advantages of the invention will become more apparent from the following detailed description when taken in conjunction with the accompanying drawings.

DESCRIPTION OF THE EMBODIMENTS

Figure 1:
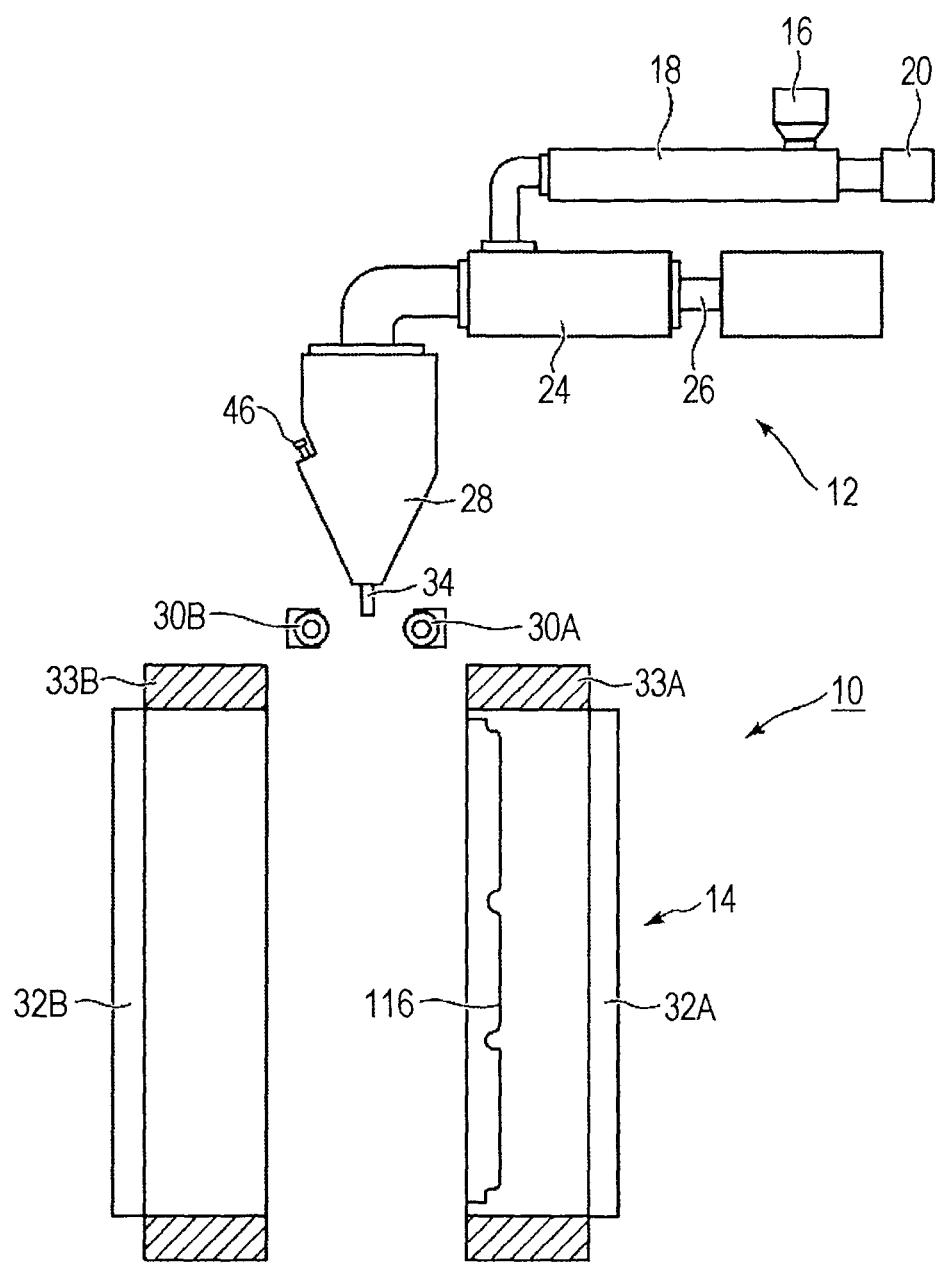
FIG. 1 is a schematic side view illustrating a resin molded article forming apparatus according to a first embodiment of the present invention.

A resin molded article forming apparatus according to a first embodiment of the present invention will be described in detail below with reference to the accompanying drawings. A resin molded article according to this embodiment is a single sheet-shaped molded article. As shown in FIG. 1, a resin molded article forming apparatus 10 includes an extruder 12 and a clamping device 14 arranged below the extruder 12. The forming apparatus 10 feeds a sheet-shaped molten resin P, which is extruded from the extruder 12, to the clamping device 14 which then forms the sheet-shaped molten resin P.

The extruder 12 is of a conventionally known type, and the detailed description thereof will be omitted. The extruder 12 includes a cylinder 18 provided with a hopper 16, a screw (not shown) installed inside the cylinder 18, a hydraulic motor 20 coupled to the screw, an accumulator 24 whose inside is in communication with the cylinder 18, and a plunger 26 inserted into the accumulator 24. In the extruder 12, resin pellets supplied through the hopper 16 are melted and kneaded inside the cylinder 18 by the screw rotated by the hydraulic motor 20. After that, the molten resin is transferred to the accumulator 24, where a predetermined amount of the resin is stored. The molten resin is then fed to a T-die 28 by being driven by the plunger 26, after which a sheet-shaped resin P in the shape of a continuous sheet is extruded through an extrusion slit 34. The resin P is then fed downward to droop between split mold blocks 32, while being nipped and pressed between a pair of rollers 30 arranged with a gap therebetween. In this manner, as will be described in detail later, the sheet-shaped resin P in the shape of a sheet is disposed between the split mold blocks 32 while having an even thickness in a vertical (extruding) direction.

An extrusion performance of the extruder 12 is appropriately selected from the viewpoints of the size of a resin molded article to be formed, and prevention of draw-down or neck-in of the sheet-shaped resin P. More specifically, from the practical point of view, an extrusion amount per one shot in intermittent extrusion is preferably 1 to 10 kg. An extrusion speed of the resin from the extrusion slit 34 is several hundred kg/hour or more, preferably 700 kg/hour or more. Also, from the viewpoint of preventing draw-down or neck-in of the sheet-shaped resin P, an extrusion step of the sheet-shaped resin P is preferably done as quickly as possible. Generally, the extrusion step is preferably finished within 40 seconds, more preferably within 10 to 20 seconds, though depending on a type, an MFR value and a melt tension value of the resin. Therefore, the extrusion amount of a thermoplastic resin from the extrusion slit 34 per unit area and unit time is 50 kg/cm$^2$ per hour or more, preferably 150 kg/cm$^2$ per hour or more. For example, a thermoplastic resin with a density of 0.9 g/cm$^3$ is extruded as the sheet-shaped resin P in the shape of a sheet, having a thickness of 1.0 mm, a width of 1000 mm and a length in the extruding direction of 2000 mm, in 15 seconds from the extrusion slit 34 of the T-die 28 having a slit gap of 0.5 mm and a slit length in the width direction of 1000 mm. In this case, 1.8 kg of the thermoplastic resin is extruded in one shot of 15 seconds. The extrusion speed, and the extrusion speed per unit area can be calculated to be 432 kg/hour and about 86 kg/cm$^2$ per hour, respectively.

As will be described later, the sheet-shaped resin can be stretched and thinned, by being sandwiched between the pair of rollers 30 and fed downward by the rotation of the pair of rollers 30. It is possible to prevent the draw-down or neck-in by adjusting a relationship between the extrusion speed of the extruded sheet-shaped resin and the feeding speed of the sheet-shaped resin by the pair of rollers 30. Therefore, it is possible to alleviate the restriction on the type of resin (particularly, the MFR value and the melt tension value) or the extrusion amount per unit time.

As shown in FIG. 1, the extrusion slit 34 provided in the T-die 28 is arranged vertically downward. A continuous sheet-shaped parison extruded from the extrusion slit 34 is fed vertically downward as it is to droop from the extrusion slit 34. As will be described later, when a gap of the extrusion slit 34 is variable, the thickness of the sheet-shaped resin P in the shape of a continuous sheet can be changed.

Figure 2:
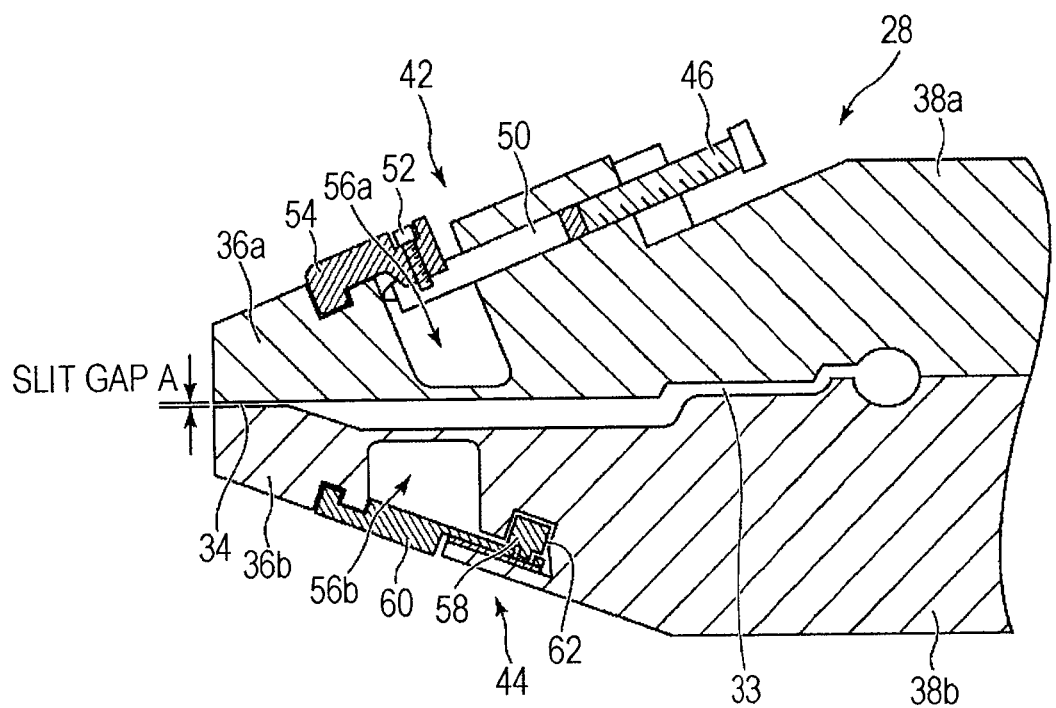
FIG. 2 is a schematic sectional view illustrating the details of a periphery of an extrusion slit in a T-die of the resin molded article forming apparatus according to the first embodiment of the present invention.

As shown in FIG. 2 (the left part thereof corresponds to the downward direction in FIG. 1), a body of the T-die 28 is constituted by putting together a die 38a having a die lip 36a at a leading end thereof, and a die 38b having a die lip 36b at a leading end thereof. A gap between the die lips 36a and 36b defines the gap of the extrusion slit 34. A slit gap adjusting device 42 and a slit gap driving device 44 are provided in order to adjust the gap of the extrusion slit. Recessed grooves 56a and 56b are formed near the die lips 36a and 36b, respectively, which makes the die lips 36a and 36b readily flexible in the vertical direction in FIG. 2. In this manner, each of the slit gap adjusting device 42 and the slit gap driving device 44 adjusts the gap of the extrusion slit 34. The slit gap adjusting device 42 and the slit gap driving device 44 each have a known configuration. However, the slit gap adjusting device 42 functions to deform the die lip 36a and adjust the evenness of the thickness in the width direction (front-rear direction in FIG. 2) of the sheet. On the other hand, the slit gap driving device 44 functions to deform the die lip 36b and adjust the thickness in the extruding direction (left-right direction in FIG. 2) of the sheet. The thermoplastic resin supplied to the T-die 28 flows from a manifold of the body of the T-die 28 shown in FIG. 2 through a resin flow path 33, and is then extruded from the extrusion slit 34 in the shape of a sheet.

The slit gap adjusting device 42 is of either a thermal expansion type or a mechanical type, and preferably has functions of both the types. A plurality of slit gap adjusting devices 42 is arranged at equal intervals along the width direction of the extrusion slit 34. Each slit gap adjusting device 42 makes the thickness of the sheet in the width direction even by narrowing or widening a slit gap A.

Figure 3:
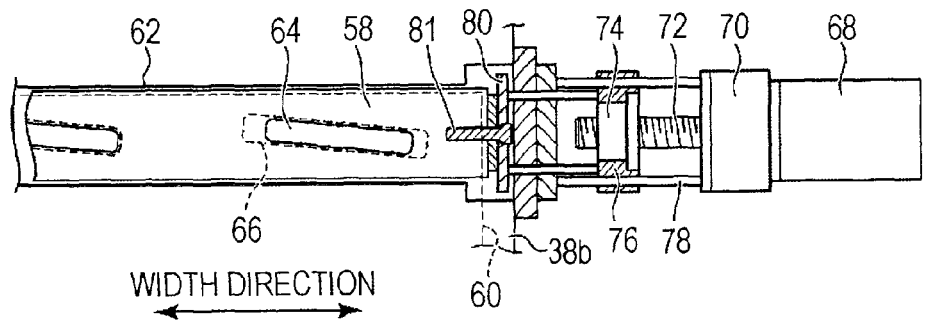
FIG. 3 is a view illustrating the details of an extrusion slit driving device in the T-die of the resin molded article forming apparatus according to the first embodiment of the present invention.
Figure 4:
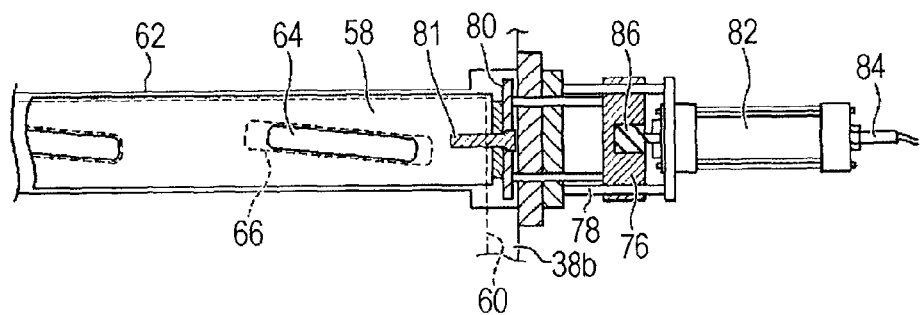
FIG. 4 is a view similar to FIG. 3 and illustrating the details of a modification of the extrusion slit driving device in the T-die of the resin molded article forming apparatus according to the first embodiment of the present invention.
Figure 5:
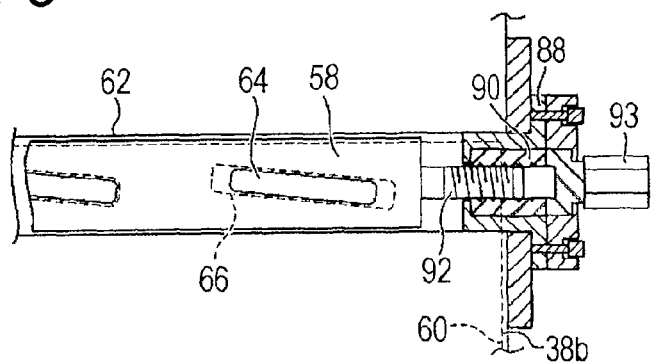
FIG. 5 is a view similar to FIG. 3 and illustrating the details of another modification of the extrusion slit driving device in the T-die of the resin molded article forming apparatus according to the first embodiment of the present invention.

FIGS. 3 to 5 are views each illustrating an aspect of the slit gap driving device. The left-right direction in each of FIGS. 3 to 5 corresponds to the front-rear direction in FIG. 2. The die lip (not shown) is located in the lower part of each of FIGS. 3 to 5. The die 38b on the other side includes a slide groove 62, which accommodates a sliding bar 58 and serves as a movable guide for the sliding bar 58, in parallel with the die lip 36. In addition, protrusions 64 are provided on the sliding bar 58. Slanted grooves 66 shown by a dashed line are formed in a driving piece 60 also shown by a dashed line. The slanted groove 66 has a predetermined length with an inclined angle with respect to a moving direction of the sliding bar 58. The protrusion 64 on the sliding bar 58 is engaged with the slanted groove 66. When the sliding bar 58 is slid along the slide groove 62, the protrusion 64 is pressed against walls of the slanted groove 66. Consequently in this structure, the driving piece 60 is moved in a direction perpendicular to the moving direction of the sliding bar 58.

The pair of rollers 30 will be described with reference to FIGS. 6A and 6B. The pair of rollers 30 is arranged below the extrusion slit 34 with rotation axes thereof being in parallel to each other and substantially horizontal. One of the rollers is a rotary driving roller 30A, and the other is a rotary driven roller 30B. More specifically, as shown in FIG. 1, the pair of rollers 30 is arranged in line symmetry with respect to the sheet-shaped resin extruded from the extrusion slit 34 to droop downward. A diameter of each roller and an axial length of the rollers can be appropriately set according to the extrusion speed of a sheet-shaped resin to be formed, a length in the extruding direction and a width of the sheet, the type of resin, and the like. As will be described later, however, preferably the diameter of the rotary driving roller 30A is slightly larger than that of the rotary driven roller 30B, for the purpose of smoothly feeding the sheet-shaped resin downward by the rotation of the pair of rollers 30 while sandwiching the sheet-shaped resin therebetween. The diameter of the roller is preferably in the range of 50 to 300 mm. Too large or small a curvature of the roller causes a trouble in which the sheet-shaped resin is wound around the roller upon contact therewith. Irregular textures are formed on an outer surface of each of the pair of rollers 30. Preferably, the irregular textures are uniformly distributed over the entire outer surface which comes into contact with the sheet-shaped resin. A depth and density of the textures only need to be appropriately determined so as to enable the pair of rollers 30 to smoothly feed the sheet-shaped resin downward by preventing sliding contact between the outer surface of each of the pair of rollers 30 and the corresponding surface of the sheet-shaped resin. Such irregular textures are formed by, for example, a conventionally known sandblast treatment. In this case, a blasting device employs a roughness of, for example, about 60 grit. Note that the irregular textures on each of the pair of rollers 30 are formed not for transferring the texture patterns onto the surface of the sheet-shaped resin, but only for preventing the sliding contact between the pair of rollers 30 and the corresponding surfaces of the sheet-shaped resin. Therefore, when transferring the texture patterns onto the surface of the sheet-shaped resin, usually one of the pair of rollers is a texturing roller, and the other is a rubber roller. In the pair of rollers in this case, on the other hand, the textures are formed on the outer surface of each of the pair of rollers, whereby each of the pair of rollers reliably holds the corresponding surface of the sheet-shaped resin. Note that the pressing force of the pair of rollers against the sheet-shaped resin may be limited, so that the texture patterns are not transferred onto the surface of the sheet-shaped resin immediately after the pair of rollers feeds the sheet-shaped resin.

The rotary driving roller 30A is provided with a roller rotary driving unit 94 and a roller moving unit 96. The roller rotary driving unit 94 enables the rotary driving roller 30A to rotate around the axial direction thereof. The roller moving unit 96, on the other hand, enables the rotary driving roller 30A to move toward or away from the rotary driven roller 30B while maintaining the parallel position with the rotary driven roller 30B, in a plane including the pair of rollers 30.

More specifically, the roller rotary driving unit 94 is a rotary driving motor 98 coupled to the rotary driving roller 30A, and a rotary torque of the rotary driving motor 98 is transmitted to the rotary driving roller 30A via, for example, a gear reduction mechanism (not shown). The rotary driving motor 98 is conventionally known. The rotary driving motor 98 is provided with a rotation speed adjusting device 100 to adjust the rotation speed of the motor 98. The rotation speed adjusting device 100 may be of a type which, for example, adjusts a value of current supplied to an electric motor. As will be described later, the rotation speed adjusting device 100 adjusts, according to the extrusion speed of the sheet-shaped resin, a relative difference in speed between the extrusion speed of the sheet-shaped resin extruded from the extruded slit 34 and the feeding speed of the sheet-shaped resin fed downward by the rotation of the pair of rollers 30. For example, when the pair of rollers each having a diameter of 100 mm is used to feed the sheet-shaped resin P having a length in the feeding direction of 2000 mm in 15 seconds, the feeding speed of the sheet-shaped resin P by the rollers corresponds to about 6.4 rotations of the rollers in one shot of 15 seconds. Therefore, the rotation speed of the rollers can be calculated to be about 25.5 rpm. The feeding speed of the sheet-shaped resin P can easily be adjusted by increasing or decreasing the rotation speed of the rollers.

Figure 6A:
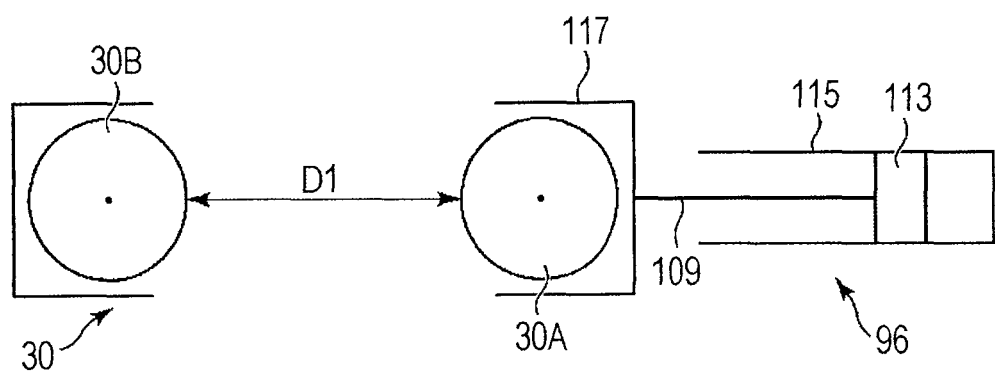
FIGS. 6A and 6B are schematic side views each illustrating a periphery of a pair of rollers of the resin molded article forming apparatus according to the first embodiment of the present invention.
Figure 6B:
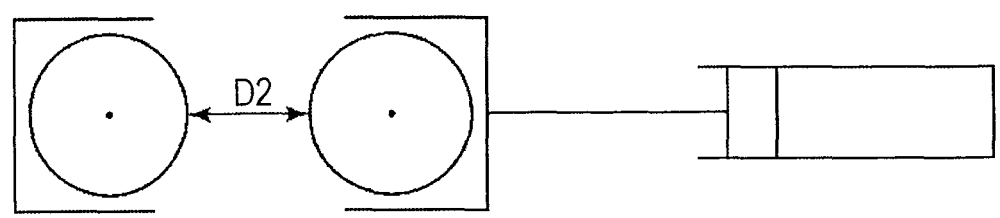
Figure 7:
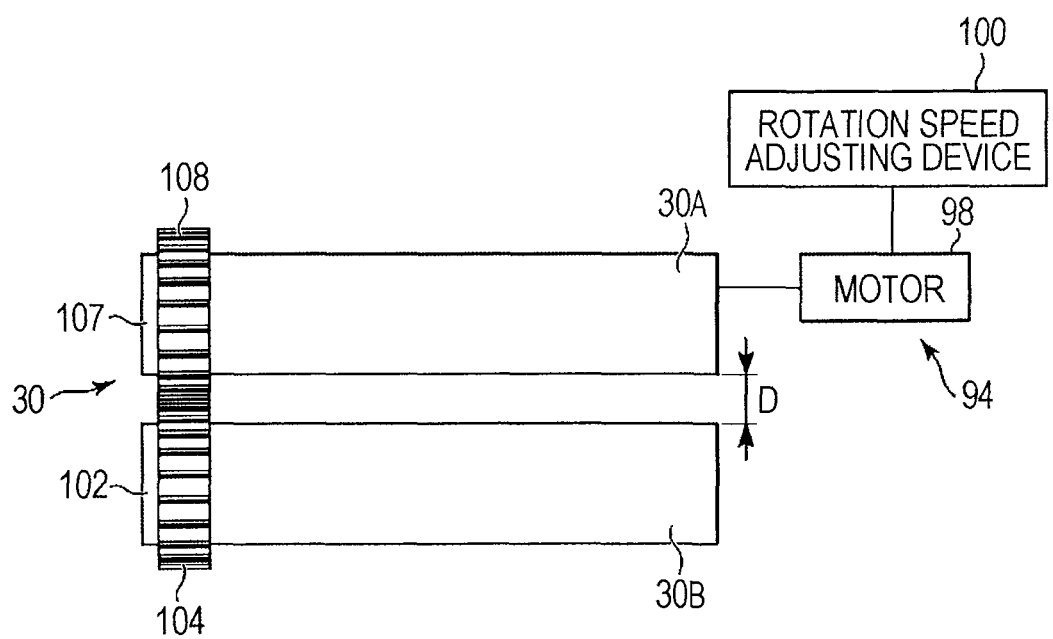
FIG. 7 is a schematic plan view illustrating the periphery of the pair of rollers of the resin molded article forming apparatus according to the first embodiment of the present invention.

As shown in FIG. 7, the rotary driven roller 30B includes, around a peripheral surface 102 at an end thereof, a first gear 104 rotatable around the rotation axis of the roller. On the other hand, the rotary driving roller 30A includes, around a peripheral surface 106 at an end thereof, a second gear 108 which is rotatable around the rotation axis of the roller and meshes with the first gear 104. Consequently, the rotary driven roller 30B is driven to rotate in synchronization with the rotary driving roller 30A. As shown in FIGS. 6A and 6B, the roller moving unit 96 includes a piston-cylinder mechanism 97. A leading end of a piston rod 109 is coupled to a cover 111 which supports the rotary driving roller 30A rotatably in the axial direction thereof. The rotary driving roller 30A is moved horizontally by sliding a piston 113 along a cylinder 115 by means of, for example, adjustment of air pressure. This makes it possible to adjust the gap between the pair of rollers 30. In this case, as will be described later, the gap between the pair of rollers 30 is widened to be larger than the thickness of the supplied sheet-shaped resin (an opened position forming a gap D1 shown in FIG. 6A) before a lowermost part of the sheet-shaped resin is supplied between the pair of rollers 30. In this manner, the sheet-shaped resin is smoothly supplied between the pair of rollers 30. After that, the gap between the pair of rollers 30 is narrowed to sandwich the sheet-shaped resin therebetween (a closed position forming a gap D2 shown in FIG. 6B), and the sheet-shaped resin is fed downward by the rotation of the rollers. A stroke of the piston 113 only needs to be set to correspond to a distance between the opened position and the closed position. In this case, each tooth tip of the first gear 104 is protruded from the outer peripheral surface of the rotary driven roller 30B, and each tooth tip of the second gear 108 is protruded from the outer peripheral surface of the rotary driving roller 30A. Consequently, in the closed position forming the gap D2 shown in FIG. 6B, the rotary driven roller 30B is driven to rotate in synchronization with the rotary driving roller 30A while maintaining the gap D2 therebetween. In this manner, the rotary driving force of the rotary driving roller 30A is transmitted to the rotary driven roller 30B to make the rotation speeds of the rollers equal to each other. This makes it possible to sandwich the sheet-shaped resin between the rollers and feed it downward. Also, the pressing force of the rollers acting on the sheet-shaped resin can be adjusted by adjusting the air pressure, when the sheet-shaped resin passes through between the pair of rollers 30. A range of the pressing force is determined such that the sheet-shaped resin is reliably fed downward, without causing the sliding contact between the surfaces of the pair of rollers 30 and the surfaces of the sheet-shaped resin while preventing the sheet-shaped resin from being torn apart by the pair of rollers 30, due to the rotation thereof. The range of the pressing force depends on the type of resin and is, for example, 0.05 MPa to 6 MPa.

Figure 26:
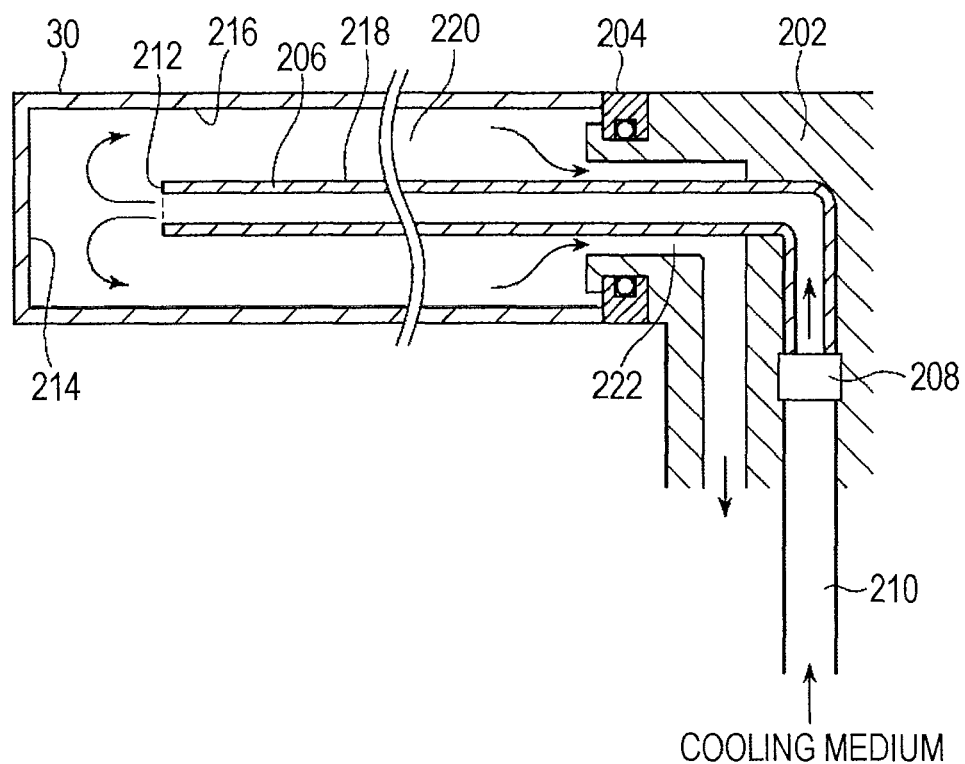
FIG. 26 is a schematic side view illustrating a periphery of a temperature controller in one of the rollers of the resin molded article forming apparatus according to the first embodiment of the present invention.

The pair of rollers 30 is made of metal, for example, aluminum. Each of the pair of rollers 30 is provided with a surface temperature adjusting unit which adjusts the surface temperature of the roller according to a temperature of a sheet-shaped molten resin. This unit circulates a cooling medium inside the roller to thereby perform heat exchange such that the surface of the roller is not excessively heated by the sheet-shaped molten resin sandwiched between the pair of rollers 30. More specifically, as shown in FIG. 26, the roller is rotatably supported by a fixing portion 202 through a bearing 204 at an end portion 200 opposite to the end portion where the gear mechanism is provided. A cooling medium supply pipe 206 extending in the axial direction of the roller is installed inside the roller while being supported by the fixing portion 202. In the fixing portion 202, the cooling medium supply pipe 206 is connected to, through a joint 208, a hose 210 connected to a cooling medium supply source (not shown), and supplies water serving as the cooling medium into the roller through the hose 210 and the cooling medium supply pipe 206. The cooling medium supply pipe 206 is arranged almost concentrically with the roller, with an open end 212 thereof facing an inner surface 214 of the end portion where the gear mechanism of the roller is provided. Consequently, the cooling medium supplied from the open end 212 is redirected in the opposite direction at the inner surface 214 of the end portion of the roller, and flows toward the fixing portion 202 through an annular space 220 formed between an inner circumferential surface 216 of the roller and an outer peripheral surface 218 of the cooling medium supply pipe 206. As a result, the entire peripheral surface of the roller is cooled from the inside. The cooling medium flowing toward the fixing portion 202 through the annular space 220 is discharged to the outside of the roller through a discharge path 222 formed in the fixing portion 202. The outer surfaces of the pair of rollers 30 are heated due to thermal conduction, upon contact between the pair of rollers 30 and the sheet-shaped molten resin. In the above-described configuration, however, the outer surfaces of the pair of rollers 30 are cooled from the inside. This effectively prevents the sheet-shaped molten resin, sandwiched between the pair of rollers 30, from closely adhering to the outer surfaces of the rollers, being wound around the rollers due to the rotation thereof, or stopping short of being fed downward for secondary forming. In this case, the surface temperature of the rollers is preferably low, from the viewpoint of preventing the winding. From the viewpoint of the secondary forming, on the other hand, too low a surface temperature of the rollers excessively cools the sheet-shaped molten resin through the surfaces of the rollers, leading to difficulty in the secondary forming. Therefore, the surface temperature of each of the pair of rollers 30 needs to be set lower than the temperature of the sheet-shaped molten resin extruded toward the pair of rollers 30 and within a predetermined temperature range. The predetermined temperature range is determined according to the type of the sheet-shaped molten resin. When the sheet-shaped resin is an amorphous resin, for example, the predetermined temperature range is from about 80° C. to about 95° C. When the sheet-shaped resin is a crystalline resin, the predetermined temperature range is from about 50° C. to about 90° C. When the inside of each of the pair of rollers 30 is cooled with water in order to adjust the surface temperature of the pair of rollers 30, the temperature of the cooling medium is preferably set according to the type of the sheet-shaped resin. The temperature of the cooling medium may be kept constant during the forming of the sheet-shaped resin.

The clamping device 14 is also of a conventionally known type, like the extruder 12, and the detailed description thereof will be omitted. The clamping device 14 includes two split mold blocks 32A and 32B, and a mold driving device which moves the mold blocks 32A and 32B between an opened position and a closed position in a direction substantially perpendicular to the direction of supplying the sheet-shaped molten resin P.

As shown in FIG. 1, the two split mold blocks 32A and 32B are arranged with cavities 116 thereof facing each other. Each of the cavities 116 is formed in a substantially vertical direction. Irregularities are formed on a surface of each of the cavities 116 according to an outer shape and a surface shape of a molded article formed from the sheet-shaped molten resin P. A pinch-off portion 118 is formed around the cavity 116 in each of the two split mold blocks 32A and 32B. The pinch-off portion 118 is formed in an annular shape around the cavity 116 and protruded toward the opposite mold block 32A or 32B. Consequently, when the two split mold blocks 32A and 32B are clamped, leading end portions of the pinch-off portions 118 abut against each other, forming a parting line PL on a peripheral edge of the sheet-shaped molten resin P. Note that when a single sheet-shaped resin molded article is formed, a single mold may be used, instead of using the split mold blocks and clamping them. In this case, the extruded sheet-shaped resin P is disposed near a side of the single mold. Then, without clamping, the sheet-shaped resin is formed in a shape conforming to a shape of the mold by depressurizing a sealed space formed between the sheet-shaped resin and the mold, and/or pressurizing the sheet-shaped resin toward the mold.

Mold frames 33A and 33B are slidably fitted onto outer peripheral portions of the two split mold blocks 32A and 32B, respectively. A mold frame moving device (not shown) enables the mold frames 33A and 33B to move relative to the mold blocks 32A and 32B, respectively. More specifically, when the mold frame 33A protrudes toward the mold block 32B more than the mold block 32A, the mold frame 33A can abut against one side surface of the sheet-shaped resin P disposed between the mold blocks 32A and 32B. When the mold frame 33B protrudes toward the mold block 32A more than the mold block 32B, the mold frame 33B can abut against the other side surface of the sheet-shaped resin P disposed between the mold blocks 32A and 32B.

The mold driving device is of a conventional type, and the description thereof will be omitted. The two split mold blocks 32A and 32B are each driven by the mold driving device. In the opened position, the continuous sheet-shaped molten resin P can be disposed between the two split mold blocks 32A and 32B. In the closed position, on the other hand, the annular pinch-off portions 118 of the two split mold blocks 32A and 32B abut against each other, thereby forming a sealed space between the two split mold blocks 32A and 32B. Note that, as to the movement of the mold blocks 32A and 32B from the opened position to the closed position, a center line of the continuous sheet-shaped molten resin P defines the closed position, toward which the mold blocks 32A and 32B move by being driven by the mold driving device.

Figure 9:
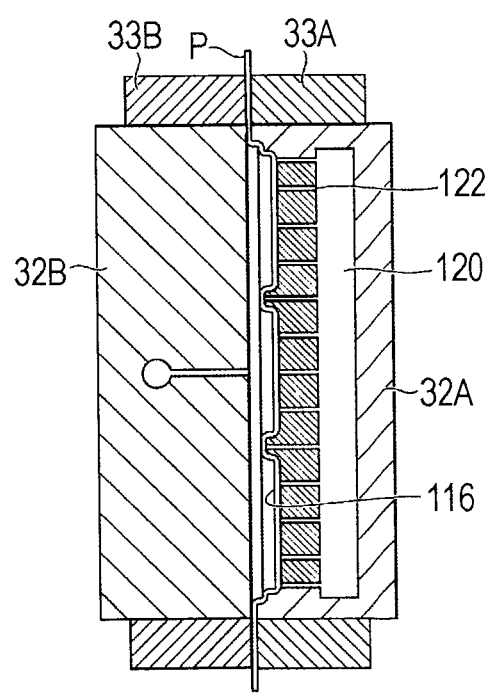
FIG. 9 is a schematic side view illustrating the split mold blocks that have been clamped, in the resin molded article forming apparatus according to the first embodiment of the present invention.

As shown in FIG. 9, a vacuum suction chamber 120 is provided inside one of the split mold blocks 32. The vacuum suction chamber 120 is in communication with the cavity 116 through suction holes 122. The sheet-shaped resin is adsorbed onto the cavity 116 to be formed into the shape conforming to the outer surface of the cavity 116, by being sucked by the vacuum suction chamber 120 through the suction holes 122.

The sheet-shaped resin P is a sheet made of polypropylene, engineering plastics, olefin-based resin, or the like. More specifically, the sheet-shaped resin P is preferably made of a resin material having a high melt tension, from the viewpoint of preventing uneven thickness which would be caused by draw-down, neck-in or the like. It is preferable, from another point of view, to use a resin material having a high fluidity for improving transferability and conformity to the mold. Specific examples of the material used include polyolefin (e.g., polypropylene and high-density polyethylene), which is a homopolymer or copolymer of olefins such as ethylene, propylene, butene, isoprene pentene and methylpentene. This material has an MFR at 230° C. (measured according to JIS K-7210 under the conditions of a test temperature of 230° C. and a test load of 2.16 kg) of 3.0 g/10 minutes or less, preferably 0.3 to 1.5 g/10 minutes. Another example is an amorphous resin such as an acrylonitrile-butadiene-styrene copolymer, polystyrene, high-impact polystyrene (HIPS resin) or an acrylonitrile-styrene copolymer (AS resin). This material has an MFR at 200° C. (measured according to JIS K-7210 under the conditions of a test temperature of 200° C. and a test load of 2.16 kg) of 3.0 to 60 g/10 minutes, preferably 30 to 50 g/10 minutes, and a melt tension at 230° C. (a tension measured using a melt tension tester manufactured by Toyo Seiki Seisaku-Sho, Ltd., by extruding a strand from an orifice having a diameter of 2.095 mm and a length of 8 mm at a residual heat temperature of 230° C. and an extrusion speed of 5.7 mm/minute, and then winding the strand around a roller having a diameter of 50 mm at a winding speed of 100 rpm) of 50 mN or more, preferably 120 mN or more.

In addition, the sheet-shaped resin P may contain an additive. Examples of the additive include inorganic fillers such as silica, mica, talc, calcium carbonate, glass fiber and carbon fiber; a plasticizer, a stabilizer, a colorant, an antistatic agent, a flame retardant, and a foaming agent. Specifically, silica, mica, glass fiber and the like are added in an amount of 50 wt % or less, preferably 30 to 40 wt %, with respect to a formed resin.

The operation of the resin molded article forming apparatus 10 having the above configuration will be described below with reference to the drawings. First, a predetermined amount of a melted and kneaded thermoplastic resin is stored in the accumulator 24. The stored thermoplastic resin is intermittently extruded from the extrusion slit 34 provided in the T-die 28 and having a predetermined gap, in a predetermined extrusion amount per unit time. In this manner, the thermoplastic resin is extruded at a predetermined extrusion speed while having a predetermined thickness, so that the thermoplastic resin is swollen to become a sheet-shaped molten resin and droops downward.

Next, a piston-cylinder mechanism 96 is driven to thereby move the pair of rollers 30 to the opened position, as shown in FIG. 6A. The gap between the pair of rollers 30 arranged below the extrusion slit 34 is widened to be larger than the thickness of the sheet-shaped resin. Consequently, a lowermost part of the sheet-shaped molten resin extruded downward can be smoothly supplied between the pair of rollers 30. Note that the gap between the pair of rollers 30 may be widened to be larger than the thickness of the sheet-shaped resin after the secondary forming is finished in each shot, not after the extrusion is started. Next, the piston-cylinder mechanism 96 is driven to thereby move the pair of rollers 30 toward each other and to the closed position, as shown in FIG. 6B. The gap between the pair of rollers 30 is narrowed to sandwich the sheet-shaped resin therebetween, and the sheet-shaped resin is fed downward by the rotation of the rollers. At this time, one of the rollers is pressed against the other, but not to the extent of crushing the sheet-shaped resin sandwiched between the pair of rollers 30, regardless of the thickness of the swollen sheet-shaped resin supplied between the pair of rollers 30. In this manner, the gap between the pair of rollers 30 is made to conform to the thickness of the supplied sheet-shaped resin. In addition, a surface temperature of each of the pair of rollers 30 is set lower than a temperature of the supplied sheet-shaped resin and within a predetermined temperature range. More specifically, when the sheet-shaped resin is sandwiched between the pair of rollers 30 and fed downward, outer surfaces of the pair of rollers 30 are heated by the sheet-shaped molten resin. Between each shot (when the pair of rollers 30 is not in contact with the sheet-shaped resin), on the other hand, the outer surfaces of the pair of rollers 30 are cooled by a cooling medium. That is, the cooling medium is supplied to inside each of the pair of rollers 30 and circulated therein, thereby cooling each of the pair of rollers 30 from the inside. The temperature of the cooling medium is kept at a predetermined temperature during the forming. This makes it possible for the surface temperature of each of the pair of rollers 30 to converge to the temperature of the cooling medium, in a stationary state during which shots are repeated many times. A dominant factor for feeding the sheet-shaped resin downward by the pair of rollers 30 is a dynamic frictional force acting between the outer surfaces of the pair of rollers 30 and the outer surfaces of the sheet-shaped resin. The dynamic frictional force is determined by a dynamic frictional coefficient determined by the materials of each of the sheet-shaped resin and the rollers, and a pressing force of the rollers against the sheet-shaped resin. In this connection, the dynamic frictional coefficient can be increased by forming irregular textures on the surface of each of the pair of rollers 30 while limiting the pressing force of the pair of rollers 30 against the sheet-shaped resin. This makes it possible to reliably feed the sheet-shaped resin downward, without causing sliding contact between the outer surface of each of the pair of rollers 30 and the corresponding surface of the sheet-shaped resin. Furthermore, the sheet-shaped resin is prevented from being wound around the pair of rollers 30 without decreasing the rotation speed of the rollers, by setting the surface temperature of each of the pair of rollers 30 lower than the temperature of the sheet-shaped resin by a predetermined temperature or more. On the other hand, by preventing the surface temperature of the rollers from being lower than the temperature of the sheet-shaped resin by a predetermined temperature or more, the sheet-shaped resin can be maintained in a molten state suitable for the secondary forming. At this time, while the swollen sheet-shaped resin is fed between the pair of rollers 30 by the rotation thereof, the rotation speed of the rollers is adjusted such that the downward feeding speed of the sheet-shaped resin by the pair of rollers 30 becomes the extrusion speed or more of the thermoplastic resin sheet. More specifically, as the swollen sheet-shaped resin is fed downward between the pair of rollers 30, a length of the sheet-shaped resin drooping in the vertical direction increases. Accordingly, the drooping sheet-shaped resin becomes thinner toward an upper part thereof due to its own weight (draw-down or neck-in). Furthermore, the rotation speed of the rollers is adjusted such that the feeding speed by the pair of rollers 30 becomes the extrusion speed or more. Thereby, the sheet-shaped resin is pulled downward by the pair of rollers 30, and is stretched and thinned. In this case, the rotation speed of the rollers is decreased with time, so that the feeding speed is adjusted to be close to the extrusion speed of the thermoplastic resin sheet.

Figure 10A:
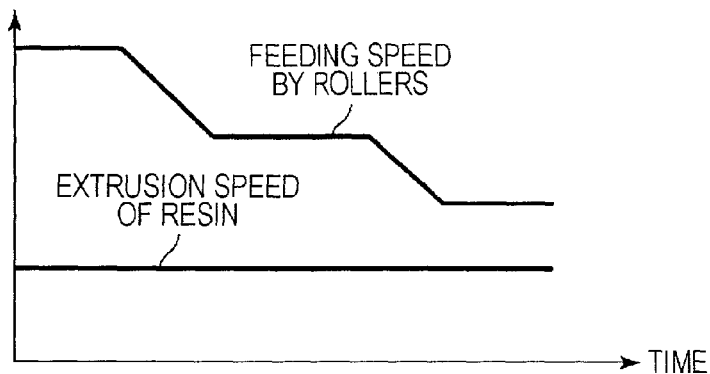
FIGS. 10A, 10B and 10C are simplified graphs each showing temporal change in an extrusion speed of the sheet-shaped resin and a rotation speed of the rollers, in the resin molded article forming apparatus according to the first embodiment of the present invention.
Figure 10B:
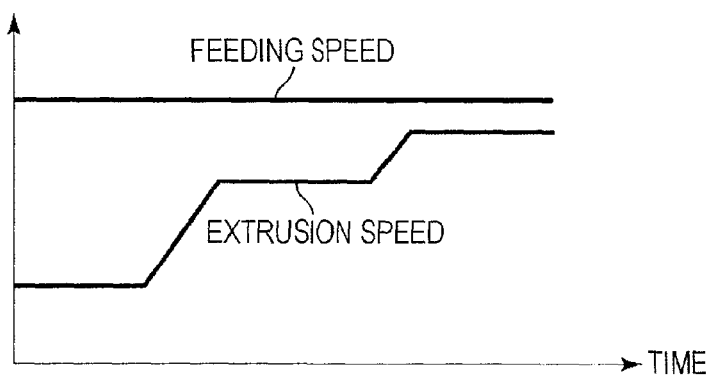
Figure 10C:
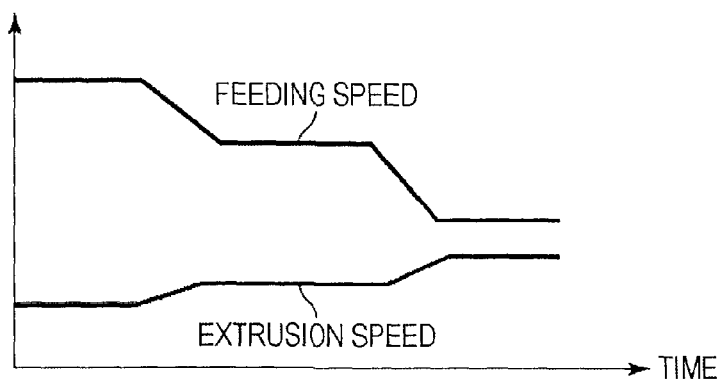

As shown in FIG. 10A, for example, the rotation speed of the rollers may be decreased in a stepwise manner with time while the extrusion speed of the thermoplastic resin sheet is kept constant. Alternatively, as shown in FIG. 10B, the extrusion speed of the thermoplastic resin sheet may be increased in a stepwise manner with time while the rotation speed of the rollers is kept constant. Further alternatively, as shown in FIG. 10C, both the rotation speed of the rollers and the extrusion speed of the thermoplastic resin sheet may be changed in a stepwise manner with time, in a range where the rotation speed of the rollers is greater than the extrusion speed. In any case, a relative difference in speed between the downward feeding speed of the sheet-shaped resin by the rotation of the pair of rollers 30 and the extrusion speed of the sheet-shaped resin is reduced with time. Consequently, a downward pulling force by the pair of rollers 30 is reduced toward the upper part of the sheet-shaped resin, which relatively reduces the stretching and thinning caused by such a pulling force. Therefore, the thinning caused by the draw-down or neck-in can be canceled, and thus the draw-down or neck-in can be effectively prevented. This makes it possible to provide an even thickness in the extruding direction.

In this case, as a modification, the adjustment of the gap of the extrusion slit 34 may be associated with the adjustment of the rotation speed of the rollers. More specifically, the rotation speed of the rollers may be decreased with time to thereby decrease the downward feeding speed of the sheet-shaped resin by the pair of rollers 30, while the slit gap adjusting device 42 and/or 44 may be used to widen the gap of the extrusion slit 34. Consequently, the thickness of the sheet-shaped resin extruded downward from the extrusion slit 34 is increased with time, in the primary forming. At the same time, the effect of stretching and thinning the sheet-shaped resin by the pair of rollers 30 is lowered. As a result, the sheet-shaped resin becomes thicker toward the upper part thereof, and the effect of stretching and thinning the sheet-shaped resin is lowered. The above synergetic effect makes it possible to more effectively prevent the draw-down or neck-in.

Particularly when the extrusion speed of the sheet-shaped resin is changed during the forming thereof as shown in FIGS. 10B and 10C, it is usually necessary to change the extrusion amount of the molten resin per unit time by the plunger 26. The change in the extrusion amount of the molten resin affects a swelling of the molten resin immediately after extruded from the extrusion slit 34. Therefore, it is preferable to adjust the gap of the extrusion slit 34 at the same time as adjusting the rotation speed of the rollers, for preventing the swelling from thickening the sheet-shaped resin. More specifically, the larger the extrusion amount per unit time, the more shortened the forming time from the start of primary forming to the end of secondary forming. As a result, forming efficiency is improved while shortening a time during which the sheet-shaped resin is drooping before the secondary forming, thereby making it possible to reduce the possibility of draw-down or neck-in. However, the larger the extrusion amount per unit time, the more prominent the swelling becomes in the sheet-shaped resin extruded from the extrusion slit 34. The thickening due to the swelling may make it necessary to adjust the gap between the pair of rollers 30. In this respect, it is a technical advantage to adjust the gap of the extrusion slit 34 to thereby adjust the thickening itself of the sheet-shaped resin caused by the swelling.

In this case, it is possible to adjust the thickness of the sheet-shaped resin to be extruded, only by adjusting the gap of the extrusion slit 34. However, it is technically more advantageous, in the following respects, to adjust the thickness of the sheet-shaped resin by adjusting the rotation speed of the pair of rollers 30.

First, the thickness of the sheet-shaped resin can be adjusted more easily by adjusting the rotation speed of the pair of rollers 30 than by adjusting the gap of the extrusion slit 34. More specifically, when the extrusion amount of the molten resin per unit time is kept constant, the narrower the gap of the extrusion slit 34, the less prominent the swelling becomes in the sheet-shaped resin. However, this increases an extrusion pressure, which accelerates the swelling of the sheet-shaped resin. Therefore, it is difficult to adjust the thickness of the sheet-shaped resin, immediately after extruded from the extrusion slit 34, to a desired value, making it necessary to determine the gap of the extrusion slit 34 on site through trial and error. It is further difficult to adjust the thickness after the swelling by changing the gap of the extrusion slit 34 during the forming.

Second, the adjustment of the rotation speed of the pair of rollers 30 is more responsive to the thickness of the sheet-shaped resin than the adjustment of the gap of the extrusion slit 34. More specifically, when the gap of the extrusion slit 34 is changed, it takes some time for the thickness of the sheet-shaped resin, immediately after extruded from the extrusion slit 34, to reach a stationary state. Therefore, a portion of the sheet-shaped resin just extruded cannot be used for the secondary forming, leading to a decrease in yield. In contrast, in the case of adjusting the rotation speed of the pair of rollers 30, a change in the rotation speed causes a change in the downward feeding speed of the sheet-shaped resin sandwiched between the pair of rollers. Consequently, the pulling force acting on the sheet-shaped resin by the pair of rollers is changed, whereby the sheet-shaped resin is stretched and thinned. Therefore, an excellent responsiveness to the thickness of the sheet-shaped resin can suppress the decrease in yield.

Third, the thickness of the sheet-shaped resin, immediately before clamping in the secondary forming, can be adjusted more easily by adjusting the rotation speed of the pair of rollers 30 than by adjusting the gap of the extrusion slit 34. More specifically, an uneven thickness in the extruding direction of the sheet-shaped resin before clamping, which would be caused by draw-down or neck-in, adversely affects a forming function of blow molding or vacuum forming. In this connection, it is more preferable to secure an even thickness of the sheet-shaped resin immediately before the mold blocks are clamped. In this respect, it is advantageous to adjust the thickness between the primary forming using extrusion and the secondary forming using blow molding or vacuum forming.

Figure 8:
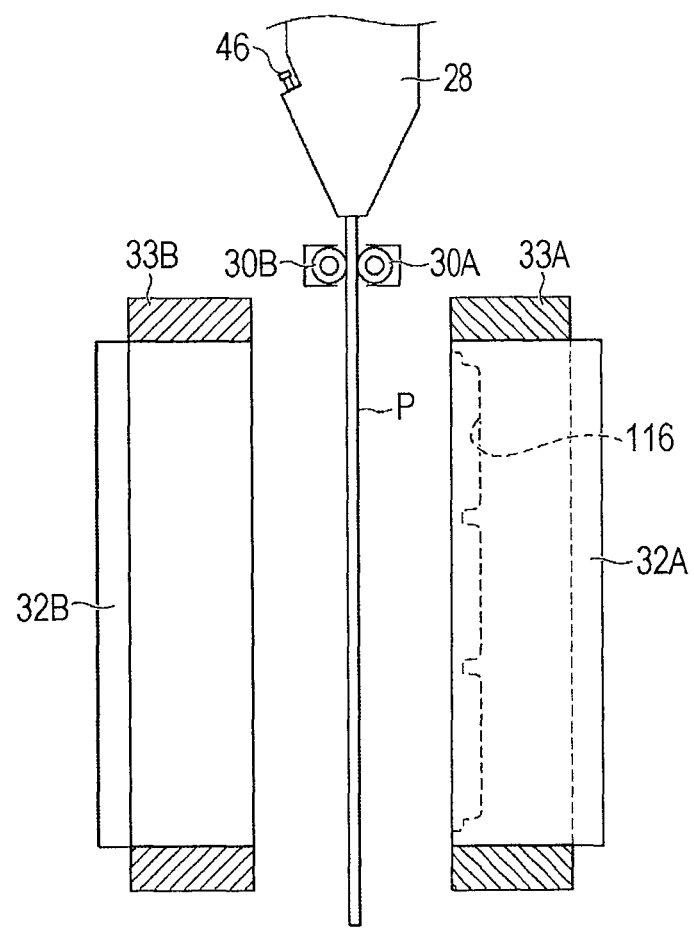
FIG. 8 is a schematic side view illustrating a sheet-shaped resin disposed between split mold blocks in the resin molded article forming apparatus according to the first embodiment of the present invention.
Figure 11:
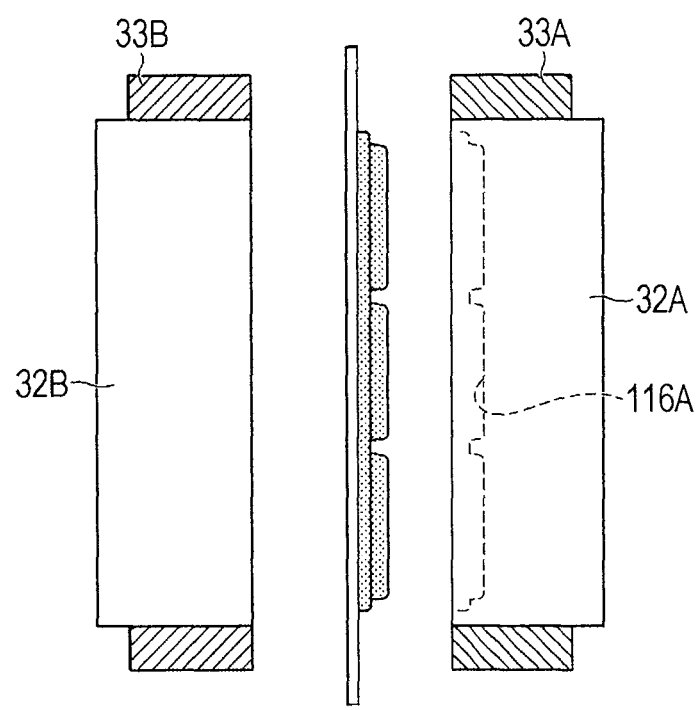
FIG. 11 is a schematic side view illustrating the split mold blocks that have been opened, in the resin molded article forming apparatus according to the first embodiment of the present invention.

Next, as shown in FIG. 8, the sheet-shaped resin having an even thickness in the extruding direction is disposed between the split mold blocks 32 arranged below the pair of rollers 30. Next, as shown in FIG. 9, the split mold blocks 32 are clamped upon complete extrusion of a predetermined amount of the sheet-shaped resin. Then, air between the sheet-shaped resin and the split mold block 32 is pressurized and/or depressurized by being sucked by the vacuum suction chamber 120 through the suction holes 122. In this manner, the sheet-shaped resin is formed in a shape conforming to a shape of the mold. This makes it possible to form a resin molded article having a desired thickness in the extruding direction, without adversely affecting the forming in the secondary forming. Next, as shown in FIG. 11, the split mold blocks 32 are opened to take out the formed resin molded article, and burrs formed around the parting line are removed. As of this moment, the secondary forming is complete. The above steps are repeated each time the molten resin is extruded intermittently in the primary forming. This makes it possible to form sheet-shaped resin molded articles one after another. As described above, it is possible to extrude a thermoplastic resin intermittently as a sheet-shaped molten resin by the primary forming (extrusion molding), and then form the extruded sheet-shaped resin by the secondary forming (blow molding or vacuum forming) using a mold.

A second embodiment of the present invention will be described below with reference to FIGS. 12 to 15. In the explanation below, the same constituent elements as those in the first embodiment are denoted by the same reference numerals and the description thereof will be omitted. Characterizing portions of the present embodiment will be described in detail below. The resin molded article of the first embodiment is a single, solid sheet-shaped molded article, whereas a resin molded article of the present embodiment is a molded article having a hollow portion and formed from two sheet-shaped resins.

In primary forming of the present embodiment, a molten thermoplastic resin is extruded from an extrusion slit 34 of a T-die 28 to droop downward in the shape of a sheet. Then in secondary forming, the sheet-shaped resin extruded downward is used to form a resin molded article by vacuum forming through clamping of split mold blocks 32. These processes are the same as those in the first embodiment. In the present embodiment, two sheet-shaped resins are formed at the same time. That is, as each of the two sheet-shaped resins, the molten thermoplastic resin is extruded from the extrusion slit 34 of the T-die 28 to droop downward in the shape of a sheet. Then in the secondary forming, the two sheet-shaped resins extruded downward are used to form a resin molded article by vacuum forming through clamping of the split mold blocks 32. These processes are different from those in the first embodiment. In the primary forming of each of the two sheet-shaped resins, as in the first embodiment, a relative difference in speed between an extrusion speed of each sheet-shaped resin and a feeding speed of feeding the sheet-shaped resin downward by a pair of rollers 30 is adjusted by adjusting a rotation speed of the pair of rollers 30. Consequently, the sheet-shaped resin is pulled downward by the pair of rollers 30 when passing therebetween, to thereby be stretched and thinned. At the same time, draw-down or neck-in which would be caused by the stretching and thinning is effectively prevented. In this case, as in the first embodiment, irregular textures are formed on a surface of each of a pair of rollers 30A and 30B, and a gear mechanism is provided at one end of each roller. In this manner, rotary driving forces of rotary driving rollers 30BA and 30AA are transmitted to rotary driven rollers 30BB and 30AB, respectively. This prevents a difference in rotation speed between the rotary driving roller and the rotary driven roller. This in turn prevents a wrinkle or shear mark from being formed on a surface of the sheet-shaped resin. As in the first embodiment, a cooling medium is circulated inside each of the pair of rollers 30A and 30B to cool the rollers. In this manner, a temperature of an outer surface of each roller is set lower than a temperature of the sheet-shaped molten resin and within a predetermined temperature range. This prevents the sheet-shaped molten resin, when sandwiched between the pair of rollers, from closely adhering to the surfaces of the rollers and being wound around the rollers due to the rotation thereof. In addition, the sheet-shaped resin is maintained in a molten state suitable for the secondary forming. Note that a gap of the extrusion slit 34 may be adjusted in conjunction with the adjustment of the rotation speed of the pair of rollers 30.

Figure 12:
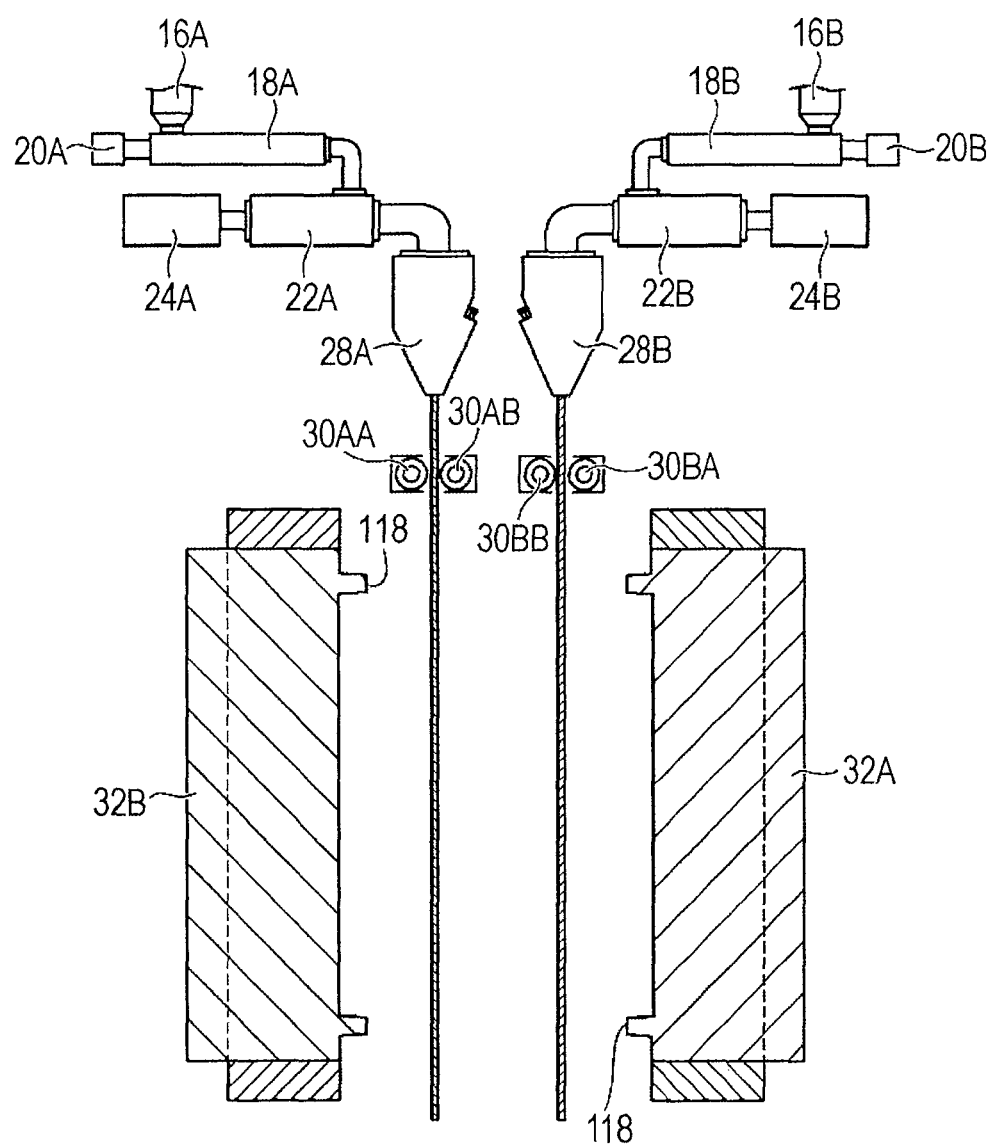
FIG. 12 is a view similar to FIG. 1 and illustrating a resin molded article forming apparatus according to a second embodiment of the present invention.
Figure 13:
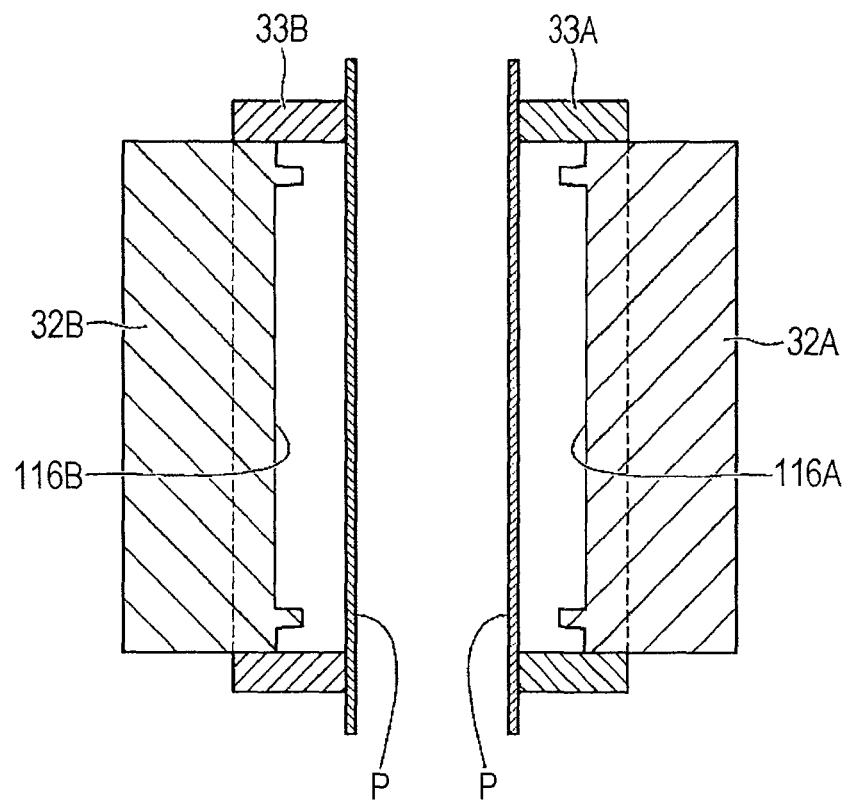
FIG. 13 is a schematic side view illustrating two sheet-shaped resins that have been sucked by split mold blocks, in the resin molded article forming apparatus according to the second embodiment of the present invention.

In the secondary forming, first, the two sheet-shaped resins are disposed between split mold blocks 32A and 32B, as shown in FIG. 12. Next, as shown in FIG. 13, mold frames 33A and 33B of the respective split mold blocks 32A and 32B are each moved toward the opposite split mold block and the corresponding one of the two sheet-shaped resins, and then abut against a side surface of the corresponding one of the two sheet-shaped resins. As a result, the respective sheet-shaped resins, and the corresponding mold frames 33 and cavities 116 form a sealed space.

Figure 14:
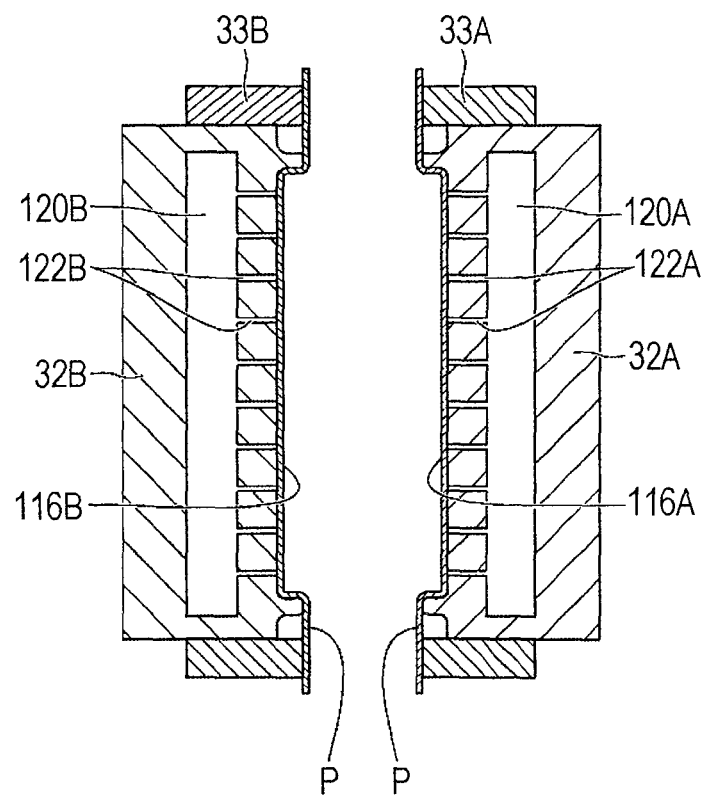
FIG. 14 is a schematic side view illustrating the two sheet-shaped resins that have been subjected to vacuum forming by the split mold blocks, respectively, in the resin molded article forming apparatus according to the second embodiment of the present invention.
Figure 15:
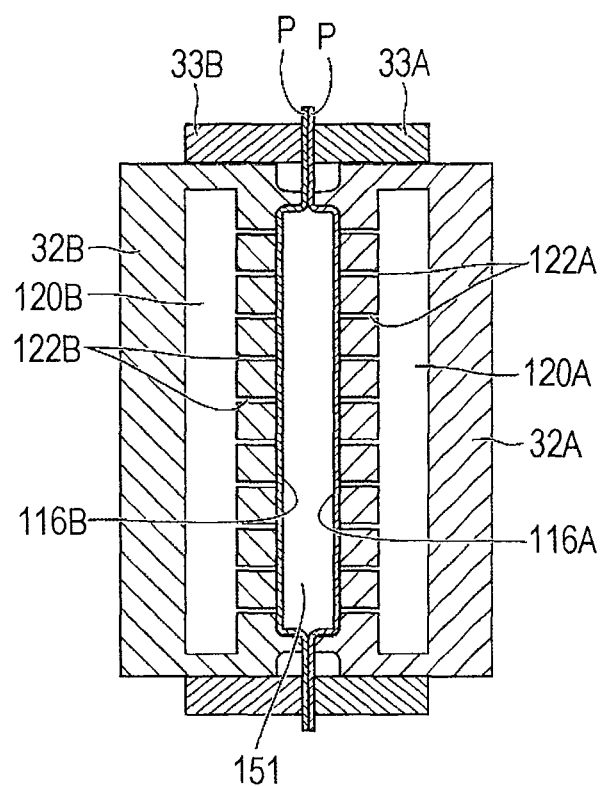
FIG. 15 is a schematic side view illustrating the split mold blocks that have been clamped, in the resin molded article forming apparatus according to the second embodiment of the present invention.

Then, as shown in FIG. 14, air inside the sealed space is sucked by a vacuum suction chamber 120 through suction holes 122. Consequently, each of the two sheet-shaped resins is adsorbed onto the corresponding cavity 116 to thereby be formed in a shape conforming to a surface of the corresponding cavity 116. In this case, the two sheet-shaped resins before the suction each have an even thickness in the vertical direction. This can prevent an unsatisfactory forming step, which would otherwise be performed due to a thickness distribution caused depending on a blow ratio. Next, as shown in FIG. 15, the mold frames 33A and 33B are moved toward each other integrally with the split mold blocks 32A and 32B, respectively, which causes the split mold blocks 32A and 32B to be clamped. Then, pinch-off portions on the respective split mold blocks 32A and 32B weld peripheral portions of the two sheet-shaped resins to each other. As a result, a sealed hollow portion 151 is formed inside the two sheet-shaped resins.

Figure 16:
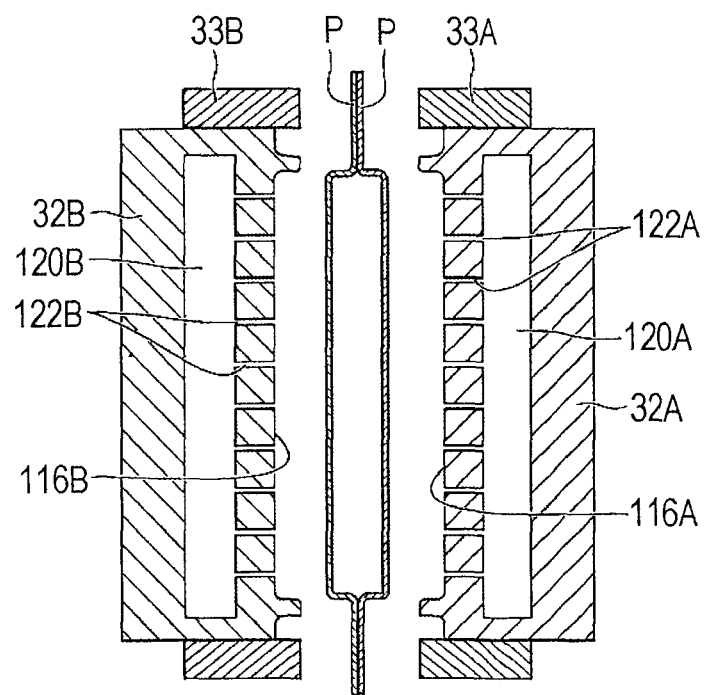
FIG. 16 is a schematic side view illustrating the split mold blocks that have been opened, in the resin molded article forming apparatus according to the second embodiment of the present invention.
Figure 17:
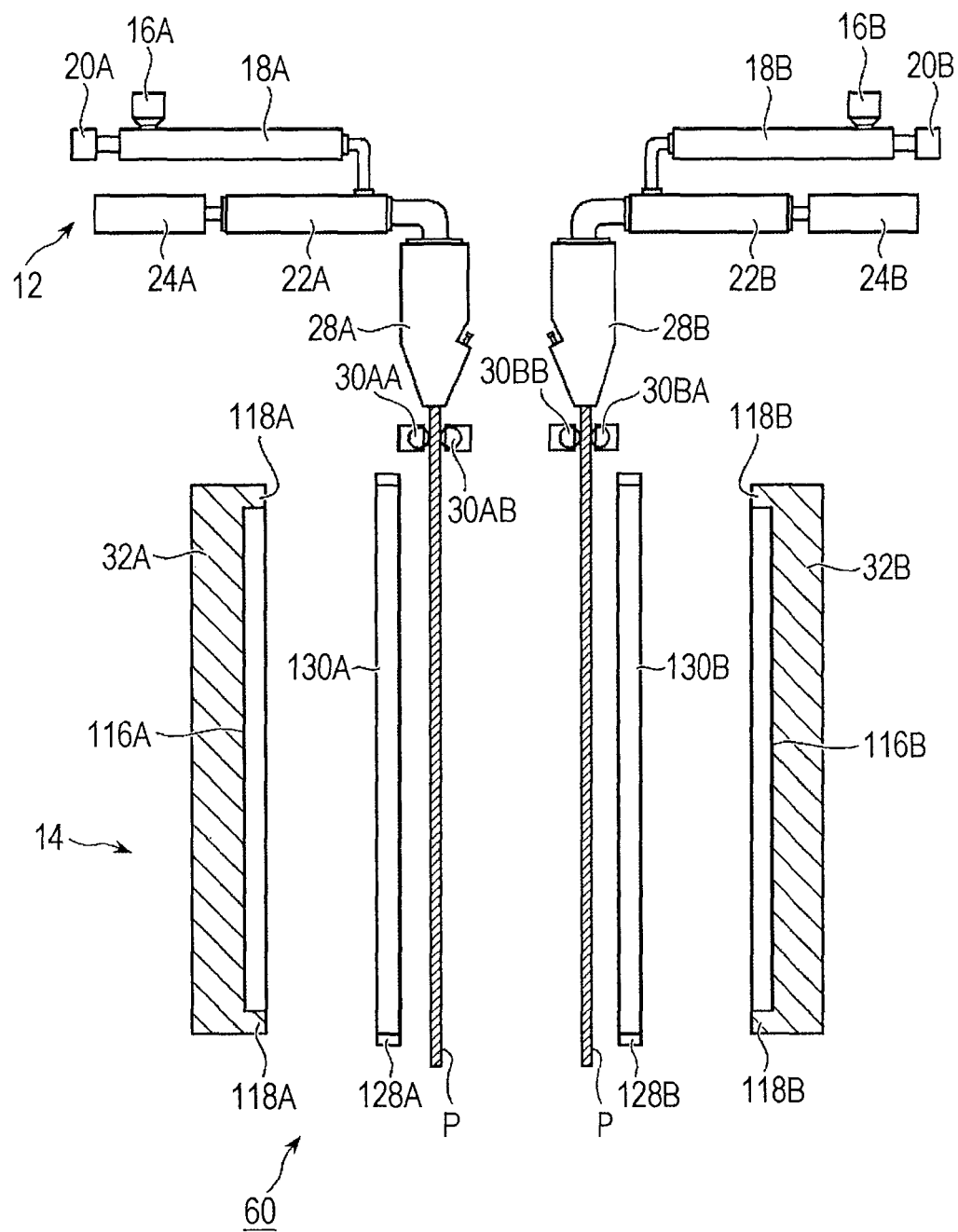
FIG. 17 is a view schematically illustrating a sandwich panel forming apparatus according to a third embodiment of the present invention.

Next, as shown in FIG. 16, the mold frames 33A and 33B are moved away from each other integrally with the split mold blocks 32A and 32B, respectively. The split mold blocks 32A and 32B are opened by this movement, and then a formed resin molded article is taken out and burrs on outer peripheral portions are removed, thereby completing the secondary forming.

It is technically difficult to form a molded article having an even thickness due to a blow ratio when, as is conventionally performed, a cylindrical parison is used to form a resin molded article having a hollow portion. According to the present embodiment, on the other hand, the two sheet-shaped resins each having an even thickness are used and, in the secondary forming, the peripheral portions of the two sheet-shaped resins are welded to each other. This makes it possible to form a molded article having a hollow portion and an even thickness. According to the present embodiment, as described above, the two sheet-shaped resins are used to form a resin molded article having a hollow portion therein. In this case, the thickness of each sheet-shaped resin in the extruding direction is made even prior to the secondary forming, by adjusting the rotation speed of the pair of rollers 30. This prevents an adverse effect on the forming in the secondary forming. Therefore, it is possible to form a sheet-shaped resin having a desired thickness in the secondary forming. The two sheet-shaped resins are used and the peripheral edges thereof are welded to each other by clamping the mold blocks, whereby a resin molded article having a hollow portion therein is need. Since the peripheral edges of the sheet-shaped resins are securely welded to each other, it is possible to obtain a resin molded article having a sufficient strength despite the hollow portion contained therein.

A third embodiment of the present invention will be described below with reference to FIGS. 17 to 25. In the explanation below, the same constituent elements as those in the second embodiment are denoted by the same reference numerals and the description thereof will be omitted. Characterizing portions of the present embodiment will be described in detail below. The resin molded article of the second embodiment is a molded article having a hollow portion and formed from two sheet-shaped resins, whereas a resin molded article of the present embodiment is a sandwich panel molded article having a reinforcing core material in a hollow portion thereof. In the present embodiment, two sheet-shaped resins are formed in primary forming. At this time, as each of the two sheet-shaped resins, a molten thermoplastic resin is extruded from an extrusion slit 34 of a T-die 28 to droop downward in the shape of a sheet. Then in secondary thinning, the two sheet-shaped resins extruded downward are used to form a resin molded article by blow molding or vacuum forming through clamping of split mold blocks 32. These processes are the same as those in the second embodiment. In the secondary forming of the second embodiment, however, a sealed hollow portion is formed inside the two sheet-shaped resins. In the present embodiment, in contrast, such a sealed hollow portion contains a separately formed reinforcing core material. That is, the present embodiment is different from the second embodiment in the forming of a sandwich panel sandwiching the reinforcing core material between the two sheet-shaped resins.

Between split mold blocks 32A and 32B of a sandwich panel forming apparatus, a pair of frame members 128A and 128B is arranged so as to be nested in the split mold blocks 32A and 32B, respectively, while being substantially in parallel to cavities 116. The pair of frame members 128A and 128B has openings 130A and 130B, respectively. A frame member driving device (not shown) moves the pair of frame members 128A and 128B horizontally. In this manner, each of the pair of frame members 128A and 128B is moved toward, and thereby holds, a corresponding sheet-shaped molten resin P. In this state, each of the frame members 128A and 128B can be moved in the opposite direction until a leading end of a pinch-off portion 118 of the corresponding mold block 32A or 32B abuts against a surface of the sheet-shaped resin P through the opening 130.

An example of a material for a reinforcing core material 150 in the present embodiment is a thermoplastic resin, examples of which include acrylic derivatives such as polyolefin (e.g., polypropylene and high-density polyethylene), which is a homopolymer or copolymer of olefins such as ethylene, propylene, butene, isoprene pentene and methylpentene, polyamide, polystyrene, polyvinyl chloride, polyacrylonitrile and ethylene-ethyl acrylate copolymer; vinyl acetate copolymers such as polycarbonate and ethylene-vinyl acetate copolymer; terpolymers such as ionomer and ethylene-propylene-dienes; ABS resin, polyolefin oxide, and polyacetal.

These materials may be used either alone or in combination of two or more. Among the thermoplastic resins, an olefin-based resin or a resin mainly containing the olefin-based resin, and a polypropylene-based resin or a resin mainly containing the polypropylene-based resin are particularly preferable in terms of a good balance among weldability to a fiber layer, mechanical strength and formability. The reinforcing core material 150 may contain an additive, examples of which include inorganic fillers such as silica, mica, talc, calcium carbonate, glass fiber and carbon fiber; a plasticizer, a stabilizer, a colorant, an antistatic agent, a flame retardant, and a foaming agent.

The sheet-shaped resin P constituting a skin material 160 may be the same as that in the first embodiment. Particularly in a sandwich panel, however, the skin material 160 is a strength material. That is, in the sandwich panel, it is preferable to ensure rigidity (particularly, flexural rigidity) of the entire panel by securing a gap between the pair of skin materials 160 disposed on both sides of the reinforcing core material 150 (i.e., bulk (thickness) of the reinforcing core material 150). Therefore, a material for the skin material 160 requires a higher rigidity than at least a material for the reinforcing core material 150.

A decorative material sheet 170 may be disposed on a surface of the skin material 160. The decorative material sheet 170 is constituted for improving an outer appearance, imparting decorativeness, and protecting an object coming into contact with a molded article (e.g., in the case of a cargo floor board, a piece of baggage placed on an upper surface of the board). Examples of a material for the decorative material sheet 170 include a fiber skin material, a sheet-shaped skin material, and a film-shaped skin material. Examples of a material for the fiber skin material include synthetic fibers such as polyester, polypropylene, polyamide, polyurethane, acrylic and vinylon; semi-synthetic fibers such as acetate and rayon; regenerated fibers such as viscous rayon and cuprammonium rayon; natural fibers such as cotton, hemp, wool and silk; and blended fibers thereof.

Examples of a structure of the decorative material sheet 170 include a nonwoven fabric, a woven fabric, a knitted fabric, and a raised fabric thereof. The nonwoven fabric used herein means a cloth-shaped article obtained by entangling fibers in parallel or alternately, or randomly dispersing fibers to &tin webs, which are then bonded to each other. Among them, a nonwoven fabric manufactured by a needle punch method is preferable in terms of reproducibility of a steric structure and appearance characteristics of a molded article. Examples of the sheet-shaped skin material and the film-shaped skin material that can be used include a thermoplastic elastomer, an embossed resin layer, a resin layer having a printed layer on an outer surface thereof, synthetic leather, and a skin layer in the shape of an anti-slip mesh.

Figure 18:
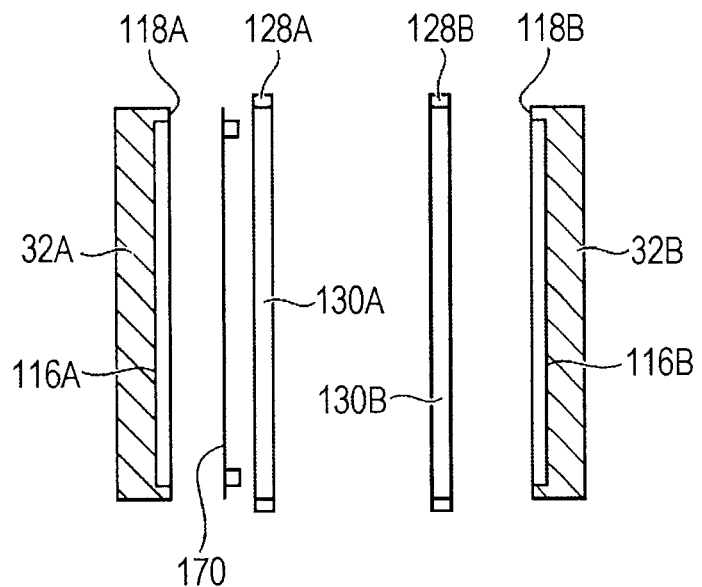
FIG. 18 is a view illustrating a decorative material sheet disposed between split mold blocks in a sandwich panel forming step according to the third embodiment of the present invention.

A method for forming such a sandwich panel 10 will be described below. First, as shown in FIG. 18, the sheet-shaped decorative material sheet 170 is inserted between one of the split mold blocks 32 and one of the frame members 128, from the side of the two split mold blocks 32. The sheet-shaped decorative material sheet 170 is temporarily fixed to one of the split mold blocks 32 so as to cover the cavity 116, with temporary fixing pins (not shown) provided on the corresponding split mold block 32.

Figure 19:
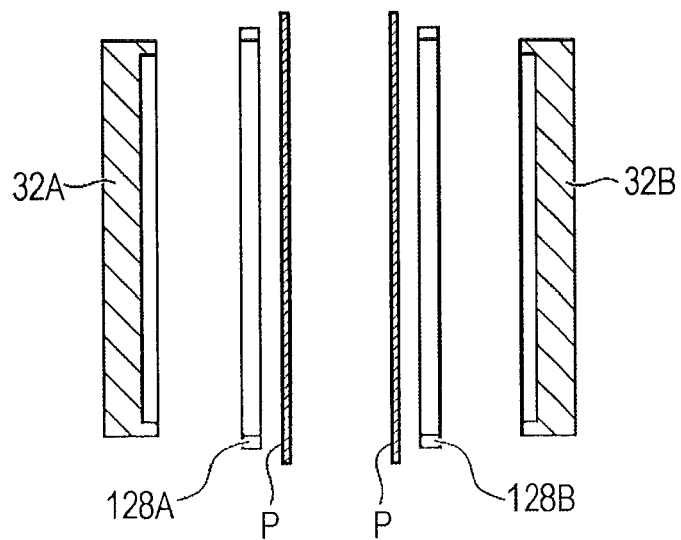
FIG. 19 is view illustrating skin material sheets disposed between the split mold blocks in a sandwich panel forming step according to the third embodiment of the present invention.

Next, as shown in FIG. 19, the two sheet-shaped molten resins P made of a thermoplastic resin are respectively extruded from the extrusion slits 34 vertically downward. At this time, as in the first and second embodiments, a rotation speed of a pair of rollers 30 is adjusted in a range where a downward feeding speed of the sheet-shaped resin P made of a thermoplastic resin, sandwiched between the pair of rollers 30 and fed by the rotation thereof, is an extrusion speed or more. In this manner, the sheet-shaped resin P made of a thermoplastic resin is stretched and thinned due to the rotation of the pair of rollers 30, while preventing draw-down or neck-in which would otherwise be caused by the stretching and thinning. This makes it possible to form the sheet-shaped resin P made of a thermoplastic resin and having an even thickness in the extruding direction, before clamping in the secondary forming. In this case, as in the first embodiment, irregular textures are formed on a surface of each of a pair of rollers 30A and 30B, and a gear mechanism is provided at one end of each roller. In this manner, rotary driving forces of rotary driving rollers 30BA and 30AA are transmitted to rotary driven rollers 30BB and 30AB, respectively. This prevents a difference in rotation speed between the rotary driving roller and the rotary driven roller. This in turn prevents a wrinkle or shear mark from being formed on a surface of the sheet-shaped resin. As in the first embodiment, a cooling medium is circulated inside each of the pair of rollers 30A and 30B to cool the rollers. In this manner, a temperature of an outer surface of each roller is set lower than a temperature of the sheet-shaped molten resin and within a predetermined temperature range. This prevents the sheet-shaped molten resin, when sandwiched between the pair of rollers, from closely adhering to the surfaces of the rollers and being wound around the rollers due to the rotation thereof. In addition, the sheet-shaped resin is maintained in a molten state suitable for the secondary forming. Note that a gap of the extrusion slit 34 may be adjusted in conjunction with the adjustment of the rotation speed of the pair of rollers 30.

Figure 20:
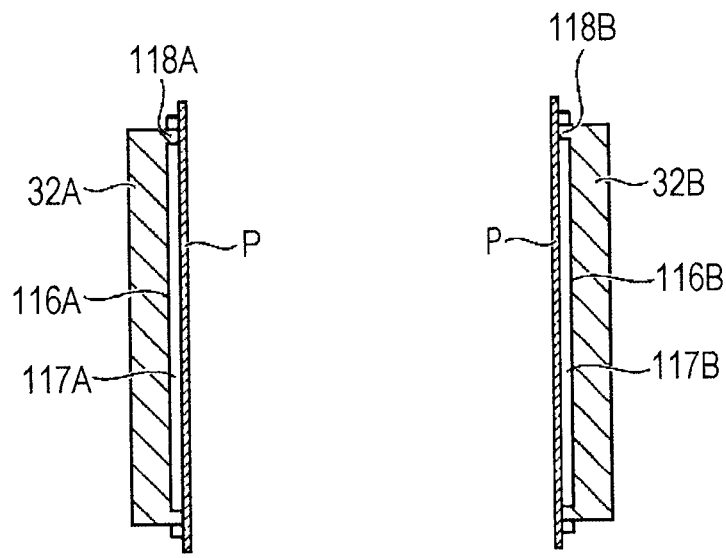
FIG. 20 is a view illustrating the skin material sheets abutting against the split mold blocks in a sandwich panel forming step according to the third embodiment of the present invention.

Next, the two continuous sheet-shaped resins P are supplied between the two split mold blocks 32. At the same time, the pair of frame members 128 is moved toward the corresponding continuous sheet-shaped resins P by the frame member driving device. Then, as shown in FIG. 20, the frame members 128 each holding the continuous sheet-shaped resin P are moved toward the corresponding split mold blocks 32. By this movement, the pinch-off portion 118 of each mold block 32 abuts against the surface of the continuous sheet-shaped resin P facing the cavity 116, through the opening 130 of the frame member 128. As a result, the surface of the continuous sheet-shaped resin P facing the cavity 116, the pinch-off portion 118, and the cavity 116 form a sealed space.

Figure 21:
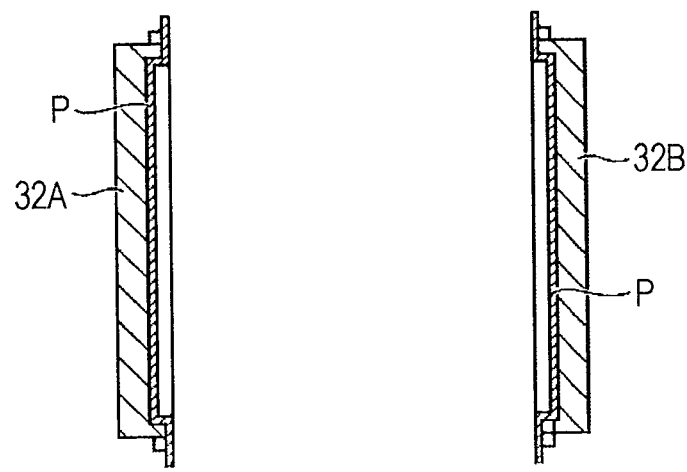
FIG. 21 is a view illustrating the skin material sheets that have been formed, in a sandwich panel forming step according to the third embodiment of the present invention.

Next, as shown in FIG. 21, each split mold block 32 sucks the corresponding sealed space. Consequently, the corresponding continuous sheet-shaped resin P is pressed against the cavity 116, to thereby be formed in a shape conforming to the cavity 116. Note that the continuous sheet-shaped resin P on the left side of FIG. 21 is welded to the decorative material sheet 170 interposed between the continuous sheet-shaped resin P and the cavity 116, at the time of being formed.

Figure 22:
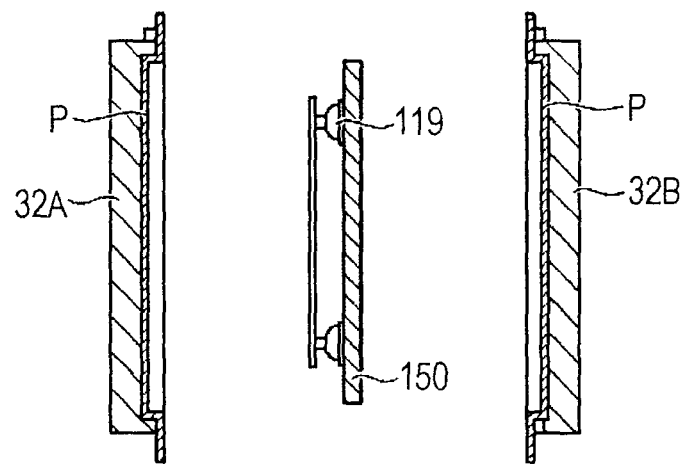
FIG. 22 is a view illustrating a core material sheet disposed between the split mold blocks in a sandwich panel forming step according to the third embodiment of the present invention.

Next, as shown in FIG. 22, the reinforcing core material 150, which is held by suction pads 119 of a manipulator (not shown), is inserted between the two split mold blocks 32 from the side thereof.

Figure 23:
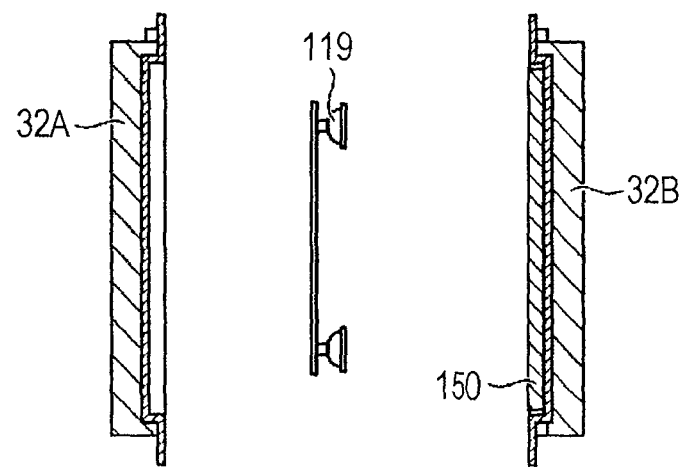
FIG. 23 is a view illustrating the core material sheet pressed against one of the skin material sheets in a sandwich panel forming step according to the third embodiment of the present invention.
Figure 24:
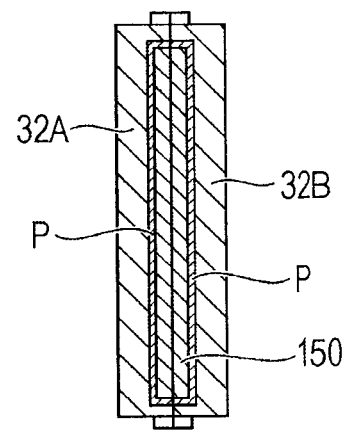
FIG. 24 is a view illustrating the split mold blocks that have been clamped, in a sandwich panel forming step according to the third embodiment of the present invention.

Next, as shown in FIG. 23, the manipulator is moved horizontally toward the split mold block 32 on the right. In this manner, the reinforcing core material 150 is pressed against, and thereby welded to, the continuous sheet-shaped resin P adsorbed onto the cavity 116 of the split mold block 32 on the right. Then, the suction pads 119 are separated from the reinforcing core material 150 to draw the manipulator from between the two split mold blocks 32, in preparation for clamping. Next, as shown in FIG. 24, the two split mold blocks 32 are moved from an opened position toward each other to a closed position by a mold driving device, to thereby be clamped. Consequently, the reinforcing core material 150 welded to one of the continuous sheet-shaped resins P (on the right in FIG. 24) is welded to the other sheet-shaped resin P. As the same time, a parting line PL is formed upon welding of peripheral edges of the continuous sheet-shaped resins P. Note that, at the time of clamping, the reinforcing core material 150 itself is formed in advance, unlike the skin material sheet 160, before being welded to the molten skin material sheet 160. Therefore, the reinforcing core material 150 itself is positioned in advance so as not to be deformed by the clamping.

Figure 25:
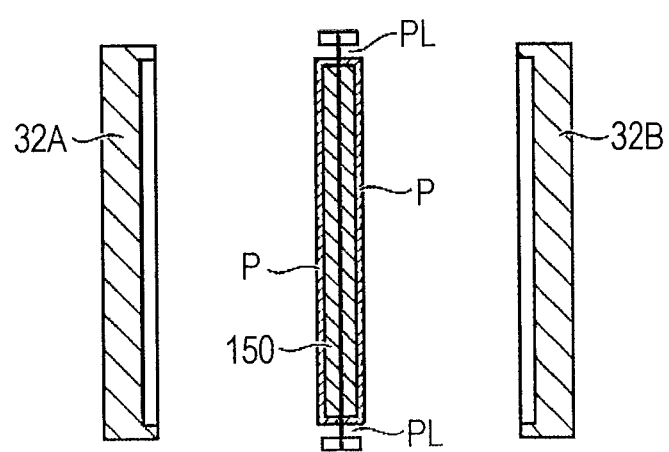
FIG. 25 is a view illustrating the split mold blocks that have been opened, in a sandwich panel forming step according to the third embodiment of the present invention.

Through the above steps, the sandwich panel 10 obtained by laminating the decorative material sheet 170, the skin material sheet 160, the reinforcing core material 150 and the skin material sheet 160, is completed. Next, as shown in FIG. 25, the two split mold blocks 32 are opened to separate the cavities 116 from the finished sandwich panel 10, and burrs formed around the parting line PL are removed. At this point, the forming of the sandwich panel is completed. In the present embodiment, the thickness of each sheet-shaped resin in the extruding direction is made even prior to the secondary forming, by adjusting the rotation speed of the pair of rollers 30. This prevents an adverse effect on the forming in the secondary forming. Therefore, it is possible to form a sheet-shaped resin having a desired thickness in the secondary forming. The above-described two sheet-shaped resins are used as skin materials to weld the peripheral edges thereof to each other by clamping, thereby forming the sandwich panel containing the reinforcing core material therein. Since the peripheral edges of the sheet-shaped resins serving as the skin materials are securely welded to each other, it is possible to obtain a sandwich panel which is required to have a sufficient strength, particularly flexural rigidity, such as a cargo floor board for a vehicle, for example.

The embodiments of the present invention have been described above in detail, but those skilled in the art can conceive of various alterations and modifications without departing from the spirit and scope of the invention. In the first embodiment, for example, the resin molded article has an even thickness in order to prevent draw-down or neck-in. However, the present invention is not limited to this example, and the rotation speed of the pair of rollers may be more actively adjusted such that the resin molded article has a desired thickness distribution in the extruding direction, before clamping in the secondary forming. In the forming of the resin molded article having a hollow portion in the second embodiment, the two sheet-shaped resins of the same type and color are used. However, the present invention is not limited to this example, and two sheet-shaped resins of different types or colors may be respectively used as a rear surface and a front surface for a casing of, for example, a game machine. In the third embodiment, the decorative material sheet is disposed between the split mold blocks and welded to the skin material sheet upon clamping of the split mold blocks. However, the present invention is not limited to this example, and a decorative material sheet may be supplied between the pair of rollers together with the sheet-shaped resins serving as the skin material sheets. Then, the decorative material sheet may be pressure-bonded to the sheet-shaped resin while the thickness of the sheet-shaped resin is adjusted by adjusting the rotation speed of the pair of rollers.

While the invention has been shown and described in detail, the foregoing description is in all aspects illustrative and not restrictive. It is therefore understood that numerous modifications and variations can be devised without departing from the spirit and scope of the invention.

What is claimed is:

1. A method of forming a resin molded article, the method comprising:
   melting and kneading a thermoplastic resin;
   storing a predetermined amount of the melted and kneaded thermoplastic resin;
   extruding the stored thermoplastic resin intermittently in a predetermined extrusion amount per unit time from an extrusion slit provided in a T-die and having a predetermined gap, such that the resin droops downward in a shape of a molten sheet as a sheet-shaped resin;
   feeding the sheet-shaped resin downward by rotary driving of a pair of rollers having a nip between the rollers larger than a predetermined thickness of the sheet-shaped resin by sandwiching the sheet-shaped resin between the rollers and by causing the rollers to move relatively toward each other after a lowermost part of the sheet-shaped resin extruded downward passes through between the rollers;
   disposing the sheet-shaped resin, fed by the rollers, near a side of a mold arranged below the rollers;
   forming the sheet-shaped resin in a shape conforming to a shape of the mold by at least one of depressurizing a sealed space formed between the sheet-shaped resin and the mold or pressurizing the sheet-shaped resin toward the mold; and
   the feeding includes
      setting a surface temperature of each of the rollers lower than a temperature of the extruded sheet-shaped resin and within a predetermined temperature range, and
      sandwiching the sheet-shaped resin between the rollers and feeding the resin downward with rotation speeds of the rollers set equal to each other by meshing of gear mechanisms, the rollers including a driving roller and a driven roller to which a rotary driving force of the driving roller is transmitted through the meshed gear mechanisms in a synchronized manner, and
      adjusting at least one of the rotation speed of the rollers or an extrusion speed of the thermoplastic resin such that a difference between the rotation speed of the rollers and the extrusion speed of the thermoplastic resin is decreased.

2. The method according claim 1, wherein the setting includes lowering the surface temperature of each of the rollers by cooling an inside of each of the rollers with a cooling medium, and a temperature of the cooling medium is set according to a type of the sheet-shaped resin.

3. The method according claim 1, wherein when the sheet-shaped resin is an amorphous resin, the predetermined temperature range is from about 80° C. to about 95° C.

4. The method according claim 1, wherein when the sheet-shaped resin is a crystalline resin, the predetermined temperature range is from about 50° C. to about 90° C.

5. A method of forming a resin molded article, the method comprising:
   melting and kneading a first thermoplastic resin;
   storing a predetermined amount of the melted and kneaded first thermoplastic resin;
   extruding the stored first thermoplastic resin intermittently from a first T-die to droop downward in a shape of a molten sheet as a first sheet-shaped resin;
   feeding the first sheet-shaped resin downward by rotary driving of a pair of first rollers arranged below the first T-die by sandwiching the first sheet-shaped resin with rotation speeds of the first rollers set equal to each other, while pulling, stretching and thinning the first sheet-shaped resin;
   setting a surface temperature of each of the first rollers lower than an outer surface temperature of the first sheet-shaped resin extruded toward the first rollers and within a predetermined first temperature range;
   melting and kneading a second thermoplastic resin;
   storing a predetermined amount of the melted and kneaded second thermoplastic resin;
   extruding the stored second thermoplastic resin intermittently from a second T-die to droop downward in a shape of a molten sheet as a second sheet-shaped resin;
   feeding the second sheet-shaped resin downward by rotary driving of a pair of second rollers arranged below the second T-die by sandwiching the second sheet-shaped resin between the second rollers with rotation speeds of the second rollers set equal to each other, while pulling, stretching and thinning the second sheet-shaped resin;
   setting a surface temperature of each of the second lower than an outer surface temperature of the second sheet-shaped resin extruded toward the second rollers and within a predetermined second temperature range; and
   disposing the first and second sheet-shaped resins, respectively fed by the first rollers and the second rollers, between first and second split mold blocks arranged below the first rollers and the second rollers, and depressurizing air between the first split mold block and the first sheet-shaped resin to cause the first sheet-shaped resin to closely adhere to a mold cavity of the first split mold block, while depressurizing air between the second split mold block and the second sheet-shaped resin to cause the second sheet-shaped resin to closely adhere to a mold cavity of the second split mold block, after which the split mold blocks are clamped, wherein,
   upon clamping the split mold blocks, the first and second sheet-shaped resins are integrated by pinch-off forming portions on outer peripheries of the mold blocks to form a resin molded article having a sealed hollow portion,
   the feeding the first sheet-shaped resin includes adjusting at least one of the rotation speed of the first rollers or an extrusion speed of the first thermoplastic resin such that a difference between the rotation speed of the first rollers and the extrusion speed of the first thermoplastic resin is decreased, and the feeding the second sheet-shaped resin includes adjusting at least one of the rotation speed of the second rollers or an extrusion speed of the second thermoplastic resin such that a difference between the rotation speed of the second rollers and the extrusion speed of the second thermoplastic resin is decreased.

6. The method according claim 1, wherein the adjusting includes
keeping the extrusion speed of the thermoplastic resin constant, and
changing the rotation speed of the rollers gradually with time.

7. The method according claim 1, wherein the adjusting includes
keeping the rotation speed of the rollers constant, and
changing the extrusion speed of the thermoplastic resin gradually with time.

8. The method according claim 1, wherein the adjusting includes changing both the rotation speed of the rollers and the extrusion speed of the thermoplastic resin gradually with time.

* * * * *